United States Patent
Apt

(10) Patent No.: US 9,967,396 B2
(45) Date of Patent: *May 8, 2018

(54) SYSTEM AND METHOD FOR MODIFYING OR DISABLING THE RINGTONE FOR AN INCOMING CALL BASED ON THE EXISTENCE OR NONEXISTENCE OF PREVIOUS CALLS FROM THE SAME CALLER

(71) Applicant: Boaz Apt, Yehud (IL)

(72) Inventor: Boaz Apt, Yehud (IL)

(73) Assignee: MUTE FIRST RING LTD., Yehud-Monosson (IL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/193,060

(22) Filed: Jun. 26, 2016

(65) Prior Publication Data

US 2016/0309025 A1 Oct. 20, 2016

Related U.S. Application Data

(60) Division of application No. 14/643,362, filed on Mar. 10, 2015, now Pat. No. 9,407,757, which is a
(Continued)

(51) Int. Cl.
*H04M 1/00* (2006.01)
*H04M 3/00* (2006.01)
(Continued)

(52) U.S. Cl.
CPC ..... *H04M 3/436* (2013.01); *H04M 1/274508* (2013.01); *H04M 1/57* (2013.01); *H04M 1/72566* (2013.01); *H04M 1/72572* (2013.01); *H04M 1/72583* (2013.01); *H04M 3/02* (2013.01); *H04M 3/42051* (2013.01); *H04M 3/42068* (2013.01); *H04M 3/42161* (2013.01); *H04M 3/42229* (2013.01); *H04M 3/42263* (2013.01); *H04M 19/04* (2013.01); *H04M 19/041* (2013.01); *H04M 19/042* (2013.01); *H04M 19/045* (2013.01);
(Continued)

(58) Field of Classification Search
CPC .......................... H04M 3/02; H04M 3/42229
USPC ..................... 379/373.02; 455/567, 415, 401
See application file for complete search history.

(56) References Cited

U.S. PATENT DOCUMENTS

| 5,329,578 A | * | 7/1994 | Brennan | H04W 8/18 |
| | | | | 379/196 |
| 2009/0002127 A1 | * | 1/2009 | Kraft | H04M 1/72522 |
| | | | | 340/7.52 |
| 2010/0067677 A1 | * | 3/2010 | Fong | H04M 1/57 |
| | | | | 379/142.05 |

* cited by examiner

*Primary Examiner* — Quynh Nguyen
(74) *Attorney, Agent, or Firm* — Mark David Torche; Patwrite Law

(57) ABSTRACT

The present invention provides a system for managing and disabling phone ring tone profiles, the system comprising: a storage system comprising (a) a plurality of ringtones adapted to be activated when an incoming call is made; (b) at least one list of identified callers to execute at least one data processing system, said at least one data processing system comprising: an acquiring module operable to read an identifier of said incoming call or an incoming message; a detecting module operable to detect if the identifier exists in said at least one list in the system, to determine the caller from said list, and to detect how many incoming calls have been made within a predetermined period of time and a disabling module adapted to either activate or disable said ringtones.

17 Claims, 5 Drawing Sheets

Related U.S. Application Data continuation-in-part of application No. 14/129,787, filed as application No. PCT/IL2013/050261 on Mar. 19, 2013, now Pat. No. 9,008,301.

(60) Provisional application No. 61/615,938, filed on Mar. 27, 2012.

(51) Int. Cl.
| | |
|---|---|
| *H04M 3/436* | (2006.01) |
| *H04M 3/42* | (2006.01) |
| *H04M 1/57* | (2006.01) |
| *H04M 19/04* | (2006.01) |
| *H04M 3/02* | (2006.01) |
| *H04M 1/2745* | (2006.01) |
| *H04M 1/725* | (2006.01) |
| *H04W 4/02* | (2018.01) |
| *H04W 88/02* | (2009.01) |

(52) U.S. Cl.
CPC ....... *H04M 19/047* (2013.01); *H04M 19/048* (2013.01); *H04W 4/027* (2013.01); *H04M 2250/60* (2013.01); *H04W 88/02* (2013.01)

SYSTEM AND METHOD FOR MODIFYING OR DISABLING THE RINGTONE FOR AN INCOMING CALL BASED ON THE EXISTENCE OR NONEXISTENCE OF PREVIOUS CALLS FROM THE SAME CALLER

FIELD OF THE INVENTION

The present invention generally pertains to a system and method for modifying the ringtone for an incoming call based on the existence of previous calls from the same caller.

BACKGROUND OF THE INVENTION

There are many methods of tailoring the signal that a message is arriving at a communication device, including allowing the caller to set a signal (U.S. Pat. No. 7,644,166); allowing the recipient to differentiate the signal depending on the grouping of signal arriving, such as having different signals for text messages, voice messages and communications from friends (U.S. Pat. No. 7,233,658); combining caller identification and receiver identification (U.S. Pat. No. 7,693,944), varying the signal according to the length of time the signal has continued (European patent application EP1885101), and allowing the caller to include an identifier signaling to the recipient the urgency of the communication (European patent application EP1874017).

However, all of prior art modify the signal of an incoming communication based only on information pertaining to that communication.

It is therefore a long felt need to provide a means whereby the signal of a pending incoming communication may be modified based on more than just the information pertaining to a single communication.

SUMMARY OF THE INVENTION

It is an object of the present invention to disclose a system for modifying the ringtone for an incoming call based on the existence of previous calls from the same caller.

It is one object of the present invention to provide a system for managing and disabling phone ring tone profiles, the system comprising:
  a. a storage system comprising (a) a plurality of ringtones adapted to be activated when an incoming call is made; and, (b) at least one list of identified callers;
  b. at least one processor to execute at least one data processing system, said at least one data processing system comprising:
    i. an acquiring module operable to read an identifier of said incoming call or an incoming message;
    ii. a detecting module operable to detect if the identifier exists in said at least one list in the system, to determine the caller from said list, and to detect how many incoming calls have been made within a first predetermined period of time having at least one selected from a group consisting of (a) being made from the same identifier, (b) being made by the same caller; and
    iii. a disabling module adapted to either activate or disable said ringtones according to at least one selected from a group consisting of (a) the number of calls by the same caller within said first predetermined period of time; (b) the number of calls having the same identifier within said first predetermined period of time; and any combination thereof;

said disabling module of said system disables said ringtones if said number of calls having said same identifier or being made by said same caller within said predetermined period of time is no more than a predetermined amount; said disabling module of said system activates said ringtones if said number of calls having said same identifier or being made by said same caller within said predetermined period of time is no less than a predetermined amount wherein at least one of the following is being held true:
  (a) said disabling module remains activated for a second predetermined period of time;
  (b) said disabling module activates after a predetermined delay time such that, after activation, said activation or said disabling of said ringtones commences upon completion of said predetermined delay time; and
  (c) any combination thereof.

It is another object of the present invention to provide the system as defined above, wherein said identifier is the caller number; said identifier is selected from a group consisting of: a cell phone number, a landline number, an e-mail address, a Skype number, an SMS number, and a what's up number, Viber, FaceTime, incoming communication, Apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger With You, any communication software that uses internet, and any combination thereof. It is another object of the present invention to provide the system as defined above, further comprising a setting module operable to provide a user interface for the system.

It is another object of the present invention to provide the system as defined above, wherein said ringtone is selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof.

It is another object of the present invention to provide the system as defined above, wherein said disabling module is adapted to select said ringtone based on at least one selected from a group consisting of: the frequency of said incoming calls, the number of said incoming calls, the number of said incoming calls within a given time, the time since the last incoming call, and any combination thereof.

It is another object of the present invention to provide the system as defined above, wherein said predetermined period of time is more than about 1 minute and less than about 12 hours.

It is another object of the present invention to provide the system as defined above, wherein said predetermined period of time is about 5 minutes.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by a ringtone, with the volume of the ringtone increasing with each call.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by ringtones, with the ringtones differing for each call in the series.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by the same ringtone.

It is another object of the present invention to provide the system as defined above, wherein the first at least one call, in a predetermined period of time, from a given caller or identifier is mute, the second and subsequent at least one calls are signaled by a ringtone, with the volume of the ringtone increasing with each call.

It is another object of the present invention to provide the system as defined above, wherein the first at least one call, in a predetermined period of time, from a given caller or identifier is mute, the second and subsequent at least one calls are signaled by ringtones, with the ringtones differing for each call in the series.

It is another object of the present invention to provide the system as defined above, wherein the first at least one call, in a predetermined period of time, from a given caller or identifier is mute, the second and subsequent at least one calls are signaled by the same ringtone.

It is another object of the present invention to provide the system as defined above, wherein the first at least one call, in a predetermined period of time, from a given caller or identifier is signaled by a ringtone, with the ringtone volume decreasing with each call, the second at least one call is signaled by a vibratory signal, and the third at least one call is mute.

It is another object of the present invention to provide the system as defined above, wherein the first at least one call, in a predetermined period of time, from a given caller or identifier is signaled by a ringtone, with the ringtones differing for each call in the series, the second at least one call is is signaled by a vibratory signal and subsequent at least one calls are mute.

It is another object of the present invention to provide the system as defined above, wherein the first at least one call, in a predetermined period of time, from a given caller or identifier is signaled by the same ringtone, second at least one call is signaled by a vibratory signal, and the third and subsequent at least one calls are mute.

It is another object of the present invention to provide the system as defined above, wherein the first at least one call, in a predetermined period of time, from a given caller or identifier is signaled by a ringtone, with the ringtone volume decreasing with each call, the second and subsequent at least one calls are mute.

It is another object of the present invention to provide the system as defined above, wherein the first at least one call, in a predetermined period of time, from a given caller or identifier is signaled by a ringtone, with the ringtones differing for each call in the series, the second and subsequent at least one calls are mute; the first at least one call, in a predetermined period of time, from a given caller or identifier is signaled by the same ringtone, second and subsequent at least one calls are mute.

It is another object of the present invention to provide the system as defined above, wherein presence of the system in a device is shown by an icon.

It is another object of the present invention to provide the system as defined above, wherein said system is activated and deactivated via said icon.

It is another object of the present invention to provide the system as defined above, wherein parameters of the system are set via said icon.

It is another object of the present invention to provide the system as defined above, wherein the default number of calls for each step in the graduated series is 1.

It is another object of the present invention to provide the system as defined above, wherein there are at least two screens of alterable parameters, a simple screen and an advanced screen It is another object of the present invention to provide the system as defined above, wherein the parameters alterable via the simple screen are selected from a group consisting of: the predetermined time, the number of calls for each step in the graded series, and any combination thereof.

It is another object of the present invention to provide the system as defined above, wherein the parameters alterable via the advanced screen are selected from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically; a time at which the application shuts down automatically; a length of time the application is to run automatically, and any combination thereof.

It is another object of the present invention to provide the system as defined above, wherein at least one portion of said system is automatically activatable at a predetermined time.

It is another object of the present invention to provide the system as defined above, wherein at least one portion of said system is automatically activatable automatically after a predetermined time period has passed.

It is another object of the present invention to provide the system as defined above, wherein at least one portion of said system is automatically activatable at such time as said device is at a predetermined location.

It is another object of the present invention to provide the system as defined above, wherein at least one portion of said system is automatically activatable at such time as said device has left a predetermined location.

It is another object of the present invention to provide the system as defined above, wherein at least one portion of said system is automatically activatable at such time as said device is moving at a speed within a predetermined range.

It is another object of the present invention to provide the system as defined above, wherein at least one portion of said system is automatically activatable at such time as said device is moving at a speed outside said given range.

It is another object of the present invention to provide the system as defined above, wherein at least one portion of said system is automatically activatable at such time as said device is in a predetermined physical position.

It is another object of the present invention to provide the system as defined above, wherein at least one portion of said system is automatically activatable at such time as said device is in a physical position different from said predetermined physical position.

It is another object of the present invention to provide the system as defined above, wherein at least one portion of said system is automatically deactivatable at a predetermined time.

It is another object of the present invention to provide the system as defined above, wherein at least one portion of said system is automatically deactivatable after a predetermined time period has passed.

It is another object of the present invention to provide the system as defined above, wherein at least one portion of said system is automatically deactivatable at such time as said device is at a predetermined location.

It is another object of the present invention to provide the system as defined above, wherein at least one portion of said system is automatically deactivatable at such time as said device has left a predetermined location.

It is another object of the present invention to provide the system as defined above, wherein at least one portion of said system is automatically deactivatable at such time as said device is moving at a speed within a predetermined range.

It is another object of the present invention to provide the system as defined above, wherein at least one portion of said system is automatically deactivatable at such time as said device is moving at a speed outside said given range.

It is another object of the present invention to provide the system as defined above, wherein at least one portion of said system is automatically deactivatable at such time as said device is in a predetermined physical position.

It is another object of the present invention to provide the system as defined above, wherein at least one portion of said system is automatically deactivatable at such time as said device is in a physical position different from said predetermined physical position; and any combination thereof.

It is another object of the present invention to provide the system as defined above, additionally comprising a private log wherein at least one of callers and call identifiers are stored for a predetermined time.

It is another object of the present invention to provide the system as defined above, wherein said ringtone is determined from the number of calls from said caller in said private log.

It is another object of the present invention to provide the system as defined above, wherein said ringtone is determined from the number of calls from said identifier in said private log.

It is another object of the present invention to provide a system for managing phone ring tone profiles, the system comprising:
  a. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
  b. at least one processor to execute at least one data processing system, said at least one data processing system comprising:
    i. an acquiring module operable to read an identifier of an incoming call or an incoming message;
    ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
    iii. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof;

one of the following being true: (a) said ring tone profile of said system is set to be said mute ring tone profile if said number of calls having said same identifier within said predetermined period of time is no more than a predetermined amount; further wherein said ring tone profile of said system is set to be said second ring tone profile if said number of calls being made by said same caller within said predetermined period of time is no less than a predetermined amount, further wherein said ring tone profile of said system is set to be said at least one second ring tone profile if said number of calls having said same identifier within said predetermined period of time is more than a predetermined amount; further wherein said ring tone profile of said system is set to be said at least one second ring tone profile if said number of calls being made by said same caller within said predetermined period of time is more than a predetermined amount; and (b) said ring tone profile of said system is set to be said mute ring tone profile if said number of calls having said same identifier within said predetermined period of time is more than a predetermined amount; further wherein said ring tone profile of said system is set to be said mute ring tone profile if said number of calls being made by said same caller within said predetermined period of time is more than a predetermined amount; further wherein said ring tone profile of said system is set to be said at least one second ring tone profile if said number of calls having said same identifier within said predetermined period of time is less than a predetermined amount; further wherein said ring tone profile of said system is set to be said at least one second ring tone profile if said number of calls being made by said same caller within said predetermined period of time is less than a predetermined amount wherein at least one of the following is being held true:
  (a) said disabling module remains activated for a second predetermined period of time;
  (b) said disabling module activates after a predetermined delay time such that, after activation, said activation or disabling of said ringtones commences upon completion of said predetermined delay time; and
  (c) any combination thereof.

It is another object of the present invention to provide the system as defined above, wherein said identifier is the caller number; said identifier is selected from a group consisting of: a cell phone number, a landline number, an e-mail address, and a Skype number, an SMS number, a what's up number, Viber, FaceTime, incoming communication, Apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger With You, any communication software that uses internet, and any combination thereof.

It is another object of the present invention to provide the system as defined above, further comprising a setting module operable to provide a user interface for the system.

It is another object of the present invention to provide the system as defined above, wherein said ringtone is selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof.

It is another object of the present invention to provide the system as defined above, wherein said switching module is adapted to select said ringtone based on at least one selected from a group consisting of: the frequency of said incoming calls, the number of said incoming calls, the number of said incoming calls within a given time, the time since the last incoming call, and any combination thereof.

It is another object of the present invention to provide the system as defined above, wherein said predetermined period of time is more than about 1 minute and less than about 12 hours.

It is another object of the present invention to provide the system as defined above, wherein said predetermined period of time is about 5 minutes.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by a ringtone, with the volume of the ringtone increasing with each call.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by ringtones, with the ringtones differing for each call in the series.

It is another object of the present invention to provide the system as defined above, wherein the first at least one call, in a predetermined period of time, from a given caller or identifier is mute, the second at least one call is signaled by a vibratory signal, and the third and subsequent at least one calls are signaled by the same ringtone.

It is another object of the present invention to provide the system as defined above, wherein the first at least one call, in a predetermined period of time, from a given caller or identifier is mute, the second and subsequent at least one calls are signaled by a ringtone, with the volume of the ringtone increasing with each call.

It is another object of the present invention to provide the system as defined above, wherein the first at least one call, in a predetermined period of time, from a given caller or identifier is mute, the second and subsequent at least one calls are signaled by ringtones, with the ringtones differing for each call in the series.

It is another object of the present invention to provide the system as defined above, wherein the first at least one call, in a predetermined period of time, from a given caller or identifier is mute, the second and subsequent at least one calls are signaled by the same ringtone.

It is another object of the present invention to provide the system as defined above, wherein the first at least one call, in a predetermined period of time, from a given caller or identifier is signaled by a ringtone, with the ringtone volume decreasing with each call, the second at least one call is signaled by a vibratory signal, and the third at least one call is mute.

It is another object of the present invention to provide the system as defined above, wherein the first at least one call, in a predetermined period of time, from a given caller or identifier is signaled by a ringtone, with the ringtones differing for each call in the series, the second at least one call is is signaled by a vibratory signal and subsequent at least one calls are mute.

It is another object of the present invention to provide the system as defined above, wherein the first at least one call, in a predetermined period of time, from a given caller or identifier is signaled by the same ringtone, second at least one call is signaled by a vibratory signal, and the third and subsequent at least one calls are mute.

It is another object of the present invention to provide the system as defined above, wherein the first at least one call, in a predetermined period of time, from a given caller or identifier is signaled by a ringtone, with the ringtone volume decreasing with each call, the second and subsequent at least one calls are mute.

It is another object of the present invention to provide the system as defined above, wherein the first at least one call, in a predetermined period of time, from a given caller or identifier is signaled by a ringtone, with the ringtones differing for each call in the series, the second and subsequent at least one calls are mute; the first at least one call, in a predetermined period of time, from a given caller or identifier is signaled by the same ringtone, second and subsequent at least one calls are mute.

It is another object of the present invention to provide the system as defined above, wherein presence of the system in a device is shown by an icon.

It is another object of the present invention to provide the system as defined above, wherein said system is activated and deactivated via said icon.

It is another object of the present invention to provide the system as defined above, wherein parameters of the system are set via said icon.

It is another object of the present invention to provide the system as defined above, the default number of calls for each step in the graduated series is 1.

It is another object of the present invention to provide the system as defined above, wherein there are at least two screens of alterable parameters, a simple screen and an advanced screen It is another object of the present invention to provide the system as defined above, wherein the parameters alterable via the simple screen are selected from a group consisting of: the predetermined time, the number of calls for each step in the graded series, and any combination thereof.

It is another object of the present invention to provide the system as defined above, wherein the parameters alterable via the advanced screen are selected from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically, a time at which the application shuts down automatically; a length of time the application is to run automatically, and any combination thereof.

It is another object of the present invention to provide the system as defined above, wherein at least one portion of said system is automatically activatable at a predetermined time.

It is another object of the present invention to provide the system as defined above, wherein at least one portion of said system is automatically activatable automatically after a predetermined time period has passed.

It is another object of the present invention to provide the system as defined above, wherein at least one portion of said system is automatically activatable at such time as said device is at a predetermined location.

It is another object of the present invention to provide the system as defined above, wherein at least one portion of said system is automatically activatable at such time as said device has left a predetermined location.

It is another object of the present invention to provide the system as defined above, wherein at least one portion of said system is automatically activatable at such time as said device is moving at a speed within a predetermined range.

It is another object of the present invention to provide the system as defined above, wherein at least one portion of said system is automatically activatable at such time as said device is moving at a speed outside said given range.

It is another object of the present invention to provide the system as defined above, wherein at least one portion of said system is automatically activatable at such time as said device is in a predetermined physical position.

It is another object of the present invention to provide the system as defined above, wherein at least one portion of said system is automatically activatable at such time as said device is in a physical position different from said predetermined physical position.

It is another object of the present invention to provide the system as defined above, wherein at least one portion of said system is automatically deactivatable at a predetermined time.

It is another object of the present invention to provide the system as defined above, wherein at least one portion of said system is automatically deactivatable after a predetermined time period has passed.

It is another object of the present invention to provide the system as defined above, wherein at least one portion of said system is automatically deactivatable at such time as said device is at a predetermined location.

It is another object of the present invention to provide the system as defined above, wherein at least one portion of said system is automatically deactivatable at such time as said device has left a predetermined location.

It is another object of the present invention to provide the system as defined above, wherein at least one portion of said system is automatically deactivatable at such time as said device is moving at a speed within a predetermined range.

It is another object of the present invention to provide the system as defined above, wherein at least one portion of said system is automatically deactivatable at such time as said device is moving at a speed outside said given range.

It is another object of the present invention to provide the system as defined above, wherein at least one portion of said system is automatically deactivatable at such time as said device is in a predetermined physical position.

It is another object of the present invention to provide the system as defined above, wherein at least one portion of said system is automatically deactivatable at such time as said device is in a physical position different from said predetermined physical position; and any combination thereof.

It is another object of the present invention to provide the system as defined above, additionally comprising a private log wherein at least one of callers and call identifiers are stored for a predetermined time.

It is another object of the present invention to provide the system as defined above, wherein said ringtone is determined from the number of calls from said caller in said private log.

It is another object of the present invention to provide the system as defined above, wherein said ringtone is determined from the number of calls from said identifier in said private log.

It is another object of the present invention to provide a method for enabling a communication device to vary an incoming call notification signal comprising steps of:
 a. providing a system comprising:
  i. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
  ii. at least one processor to execute at least one data processing system, said at least one data processing system comprising:
   1. an acquiring module operable to read an identifier of an incoming call or an incoming message;
   2. a detecting module operable to detect if the identifier exists in said at least one list in the system, to determine the caller from said list, and to detect how many incoming calls have been made within a first predetermined period of time having at least one selected from a group consisting of (a) being made from the same identifier; (b) being made by the same caller; and
   3. a switching module operable to select the current ring tone from said plurality of stored ringtones according to at least one selected from a group consisting of (a) the number of calls by the same caller within said first predetermined period of time; (b) the number of calls having the same identifier within said first predetermined period of time; and any combination thereof
 b. receiving an incoming call;
 c. identifying said identifier for said incoming call;
 d. counting at least one selected from a group consisting of (a) calls from the same identifier; (b) calls made by the same caller;
 e. setting the current ringtone based on said number of calls, one of the following being true: (a) said current ringtone being said mute ringtone profile if said number of calls having either said same identifier or being made by said same caller, within said predetermined period of time, is less than a predetermined number and said current ringtone being said second ring tone profile if said number of calls having either said same identifier or being made by said same caller, within said predetermined period of time, is no less than a predetermined number; and (b) said current ringtone being said mute ringtone profile if said number of calls having either said same identifier or being made by said same caller, within said predetermined period of time, is more than a predetermined number; setting said current ringtone to be said second ring tone profile if said number of calls having either said same identifier or being made by said same caller, within said predetermined period of time, is less than a predetermined number;
wherein at least one of the following is being held true:
 a. said disabling module remains activated for a second predetermined period of time;
 b. said disabling module activates after a predetermined delay time such that, after activation, said activation or disabling of said ringtones commences upon completion of said predetermined delay time; and
 c. any combination thereof.

It is another object of the present invention to provide the method as defined above, comprising an additional step of selecting said identifier to be the caller number; said identifier is selected from a group consisting of: a cell phone number, a landline number, an e-mail address, and a Skype number, an SMS number, a what's up number, Viber, FaceTime, incoming communication, apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger With You, any communication software that uses internet, and any combination thereof.

It is another object of the present invention to provide the method as defined above, comprising an additional step of providing a setting module operable to provide a user interface for the system.

It is another object of the present invention to provide the method as defined above, comprising an additional step of selecting said ringtone from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof.

It is another object of the present invention to provide the method as defined above, comprising an additional step of basing selection of said ringtone by said switching module on at least one selected from a group consisting of: the frequency of said incoming calls, the number of said incoming calls, the number of said incoming calls within a given time, the time since the last incoming call, and any combination thereof.

It is another object of the present invention to provide the method as defined above, comprising an additional step of specifying said first predetermined period of time to be more than about 1 minute and less than about 12 hours.

It is another object of the present invention to provide the method as defined above, comprising an additional step of specifying said first predetermined period of time to be about 5 minutes.

It is another object of the present invention to provide the method as defined above, comprising an additional step of setting the first at least one call, in a predetermined period of time, from a given caller or identifier to be mute, the second at least one call is to be signaled by a vibratory signal, and the third and subsequent at least one calls to be signaled by a ringtone, with the volume of the ringtone increasing with each call.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by ringtones, with the ringtones differing for each call in the series.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by the same ringtone.

It is another object of the present invention to provide the method as defined above, comprising an additional step of setting the first at least one call, in a predetermined period of time, from a given caller or identifier to be mute, the second and subsequent at least one calls to be signaled by a ringtone, with the volume of the ringtone increasing with each call.

It is another object of the present invention to provide the method as defined above, comprising an additional step of setting the first at least one call, in a predetermined period of time, from a given caller or identifier to be mute, the second and subsequent at least one calls to be signaled by ringtones, with the ringtones differing for each call in the series.

It is another object of the present invention to provide the method as defined above, comprising an additional step of setting the first at least one call, in a predetermined period of time, from a given caller or identifier to be mute, the second and subsequent at least one calls to be signaled by the same ringtone.

It is another object of the present invention to provide the method as defined above, comprising an additional step of setting the first at least one call, in a predetermined period of time, from a given caller or identifier to be signaled by a ringtone, with the ringtone volume decreasing with each call, the second at least one call to be signaled by a vibratory signal, and the third at least one call to be mute.

It is another object of the present invention to provide the method as defined above, comprising an additional step of setting the first at least one call, in a predetermined period of time, from a given caller or identifier to be signaled by a ringtone, with the ringtones differing for each call in the series, the second at least one call to be to be signaled by a vibratory signal and subsequent at least one calls being mute.

It is another object of the present invention to provide the method as defined above, comprising an additional step of setting the first at least one call, in a predetermined period of time, from a given caller or identifier to be signaled by the same ringtone, second at least one call to be signaled by a vibratory signal, and the third and subsequent at least one calls being mute.

It is another object of the present invention to provide the method as defined above, comprising an additional step of setting the first at least one call, in a predetermined period of time, from a given caller or identifier to be signaled by a ringtone, with the ringtone volume decreasing with each call, the second and subsequent at least one calls being mute.

It is another object of the present invention to provide the method as defined above, comprising an additional step of setting the first at least one call, in a predetermined period of time, from a given caller or identifier to be signaled by a ringtone, with the ringtones differing for each call in the series, the second and subsequent at least one calls being mute.

It is another object of the present invention to provide the method as defined above, comprising an additional step of setting the first at least one call, in a predetermined period of time, from a given caller or identifier to be signaled by the same ringtone, second and subsequent at least one calls being mute.

It is another object of the present invention to provide the method as defined above, comprising an additional step of displaying an icon to symbolize presence of the system in a device.

It is another object of the present invention to provide the method as defined above, comprising an additional step of activating and deactivating the system via the icon.

It is another object of the present invention to provide the method as defined above, comprising an additional step of setting parameters of the system via the icon.

It is another object of the present invention to provide the method as defined above, comprising an additional step of setting the default number of calls for each step in the graduated series to 1.

It is another object of the present invention to provide the method as defined above, comprising an additional step of providing at least two screens of alterable parameters, a simple screen and an advanced screen.

It is another object of the present invention to provide the method as defined above, comprising an additional step of selecting the parameters alterable via the simple screen from a group consisting of: the predetermined time, the number of calls for each step in the graded series, and any combination thereof.

It is another object of the present invention to provide the method as defined above, comprising an additional step of selecting the parameters alterable via the advanced screen from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which at least a portion of the applications starts automatically; a time at which at least a portion of the application shuts down automatically; a length of time the application is to run automatically; whether a graduated series is an increasing or a decreasing series, locations at which said system is activated or deactivated; speeds at which said system is activated or deactivated; types of user for which said system is automatically activated or automatically deactivated and any combination thereof.

It is another object of the present invention to provide the method as defined above, additionally comprising a step of providing a private log wherein at least one of callers and call identifiers are stored for a predetermined time.

It is another object of the present invention to provide the method as defined above, additionally comprising a step of determining said ringtone from the number of calls from said caller in said private log.

It is another object of the present invention to provide the method as defined above, additionally comprising a step of determining said ringtone from the number of calls from said identifier in said private log.

It is another object of the present invention to provide the method as defined above, additionally comprising a step of automatically activating at least one portion of said system at a predetermined time.

It is another object of the present invention to provide the method as defined above, additionally comprising a step of automatically activating at least one portion of said system after a predetermined time period has passed.

It is another object of the present invention to provide the method as defined above, additionally comprising a step of automatically activating at least one portion of said system at such time as said device is at a predetermined location.

It is another object of the present invention to provide the method as defined above, additionally comprising a step of automatically activating at least one portion of said system at such time as said device has left a predetermined location.

It is another object of the present invention to provide the method as defined above, additionally comprising a step of automatically activating at least one portion of said system at such time as said device is moving at a speed within a predetermined range.

It is another object of the present invention to provide the method as defined above, additionally comprising a step of automatically activating at least one portion of said system at such time as said device is moving at a speed outside said given range.

It is another object of the present invention to provide the method as defined above, additionally comprising a step of automatically activating at least one portion of said system at such time as said device is in a predetermined physical position.

It is another object of the present invention to provide the method as defined above, additionally comprising a step of automatically activating at least one portion of said system at such time as said device is in a physical position different from said predetermined physical position.

It is another object of the present invention to provide the method as defined above, additionally comprising a step of automatically deactivating at least one portion of said system at a predetermined time.

It is another object of the present invention to provide the method as defined above, additionally comprising a step of automatically deactivating at least one portion of said system after a predetermined time period has passed.

It is another object of the present invention to provide the method as defined above, additionally comprising a step of automatically deactivating at least one portion of said system at such time as said device is at a predetermined location.

It is another object of the present invention to provide the method as defined above, additionally comprising a step of automatically deactivating at least one portion of said system at such time as said device has left a predetermined location.

It is another object of the present invention to provide the method as defined above, additionally comprising a step of automatically deactivating at least one portion of said system at such time as said device is moving at a speed within a predetermined range.

It is another object of the present invention to provide the method as defined above, additionally comprising a step of automatically deactivating at least one portion of said system at such time as said device is moving at a speed outside said given range.

It is another object of the present invention to provide the method as defined above, additionally comprising a step of automatically deactivating at least one portion of said system at such time as said device is in a predetermined physical position.

It is another object of the present invention to provide the method as defined above, additionally comprising a step of automatically deactivating at least one portion of said system at such time as and said device is in a physical position different from said predetermined physical position.

It is another object of the present invention to provide a method for managing and disabling phone ring tone profiles, comprising steps of:
  a. providing a system comprising:
    i. a storage system comprising (a) a plurality of ringtones adapted to be activated when an incoming call is made; and, (b) at least one list of identified callers;

ii. at least one processor to execute at least one data processing system, said at least one data processing system comprising:
  1. an acquiring module operable to read an identifier of an incoming call or an incoming message;
  2. a detecting module operable to detect if the identifier exists in said at least one list in the system, to determine the caller from said list, and to detect how many incoming calls have been made within a first predetermined period of time having at least one selected from a group consisting of (a) being made from the same identifier, (b) being made by the same caller; and,
  3. a disabling module adapted to either activate or disable said ringtones according to at least one selected from a group consisting of (a) the number of calls by the same caller within said first predetermined period of time; (b) the number of calls having the same identifier within said first predetermined period of time; and any combination thereof;
b. receiving an incoming call;
c. identifying said identifier for said incoming call;
d. counting at least one selected from a group consisting of (a) calls from the same identifier; (b) calls made by the same caller;
e. one of: disabling said ringtones if said number of calls having said same identifier or being made by said same caller within said predetermined period of time is less than a predetermined amount; or enabling said ringtones if said number of calls having said same identifier or being made by said same caller within said predetermined period of time is no less than a predetermined amount; or (b) disabling said ringtones if said number of calls having said same identifier or being made by said same caller within said predetermined period of time is more than a predetermined amount; or enabling said ringtones if said number of calls having said same identifier or being made by said same caller within said predetermined period of time is no more than a predetermined amount.

It is another object of the present invention to provide the method as defined above, comprising an additional step of selecting said identifier to be the caller number; said identifier is selected from a group consisting of: a cell phone number, a landline number, an e-mail address, and a Skype number, an SMS number, a what's up number, Viber, FaceTime, incoming communication, apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger With You, any communication software that uses internet, and any combination thereof.

It is another object of the present invention to provide the method as defined above, further comprising a setting module operable to provide a user interface for the system.

It is another object of the present invention to provide the method as defined above, comprising an additional step of selecting said ringtone from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof.

It is another object of the present invention to provide the method as defined above, comprising an additional step of basing selection of said ringtone by said disabling module on at least one selected from a group consisting of: the frequency of said incoming calls, the number of said incoming calls, the number of said incoming calls within a given time, the time since the last incoming call, and any combination thereof.

It is another object of the present invention to provide the method as defined above, comprising an additional step of specifying said predetermined period of time to be more than about 1 minute and less than about 12 hours.

It is another object of the present invention to provide the method as defined above, comprising an additional step of specifying said predetermined period of time to be about 5 minutes.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by a ringtone, with the volume of the ringtone increasing with each call.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by ringtones, with the ringtones differing for each call in the series.

It is another object of the present invention to provide the method as defined above, comprising an additional step of setting the first at least one call, in a predetermined period of time, from a given caller or identifier to be mute, the second at least one call to be signaled by a vibratory signal, and the third and subsequent at least one calls to be signaled by the same ringtone.

It is another object of the present invention to provide the method as defined above, comprising an additional step of setting the first at least one call, in a predetermined period of time, from a given caller or identifier to be mute, the second and subsequent at least one calls to be signaled by a ringtone, with the volume of the ringtone increasing with each call.

It is another object of the present invention to provide the method as defined above, comprising an additional step of setting the first at least one call, in a predetermined period of time, from a given caller or identifier to be mute, the second and subsequent at least one calls to be signaled by ringtones, with the ringtones differing for each call in the series.

It is another object of the present invention to provide the method as defined above, comprising an additional step of setting the first at least one call, in a predetermined period of time, from a given caller or identifier to the mute ringtone, and setting the signal for the second and subsequent at least one calls to be said second ringtone.

It is another object of the present invention to provide the method as defined above, comprising an additional step of setting the first at least one call, in a predetermined period of time, from a given caller or identifier to be signaled by a ringtone, with the ringtone volume decreasing with each call, the second at least one call to be signaled by a vibratory signal, and the third at least one call to be mute.

It is another object of the present invention to provide the method as defined above, comprising an additional step of setting the first at least one call, in a predetermined period of time, from a given caller or identifier to be signaled by a ringtone, with the ringtones differing for each call in the series, the second at least one call to be to be signaled by a vibratory signal and subsequent at least one calls being mute.

It is another object of the present invention to provide the method as defined above, comprising an additional step of setting the first at least one call, in a predetermined period of time, from a given caller or identifier to be signaled by the same ringtone, second at least one call to be signaled by a vibratory signal, and the third and subsequent at least one calls being mute.

It is another object of the present invention to provide the method as defined above, comprising an additional step of setting the first at least one call, in a predetermined period of time, from a given caller or identifier to be signaled by a ringtone, with the ringtone volume decreasing with each call, the second and subsequent at least one calls being mute.

It is another object of the present invention to provide the method as defined above, comprising an additional step of setting the first at least one call, in a predetermined period of time, from a given caller or identifier to be signaled by a ringtone, with the ringtones differing for each call in the series, the second and subsequent at least one calls being mute.

It is another object of the present invention to provide the method as defined above, comprising an additional step of setting the first at least one call, in a predetermined period of time, from a given caller or identifier to be signaled by the same ringtone, second and subsequent at least one calls being mute; and any combination thereof.

It is another object of the present invention to provide the method as defined above, comprising an additional step of showing the presence of the system in a device by an icon.

It is another object of the present invention to provide the method as defined above, comprising an additional step of activating and deactivating said system via said icon.

It is another object of the present invention to provide the method as defined above, comprising an additional step of setting the parameters of the system via said icon.

It is another object of the present invention to provide the method as defined above, comprising an additional step of setting the default number of calls for each step in the graduated series to 1.

It is another object of the present invention to provide the method as defined above, comprising an additional step of providing at least two screens of alterable parameters, a simple screen and an advanced screen.

It is another object of the present invention to provide the method as defined above, comprising an additional step of selecting the parameters alterable via the simple screen from a group consisting of: the predetermined time, the number of calls for each step in the graded series, and any combination thereof.

It is another object of the present invention to provide the method as defined above, comprising an additional step of selecting the parameters alterable via the advanced screen from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which the applications starts automatically; and a time at which the application shuts down automatically.

It is another object of the present invention to provide the method as defined above, additionally comprising a step of providing a private log wherein at least one of callers and call identifiers are stored for a predetermined time.

It is another object of the present invention to provide the method as defined above, additionally comprising a step of determining said ringtone from the number of calls from said caller in said private log.

It is another object of the present invention to provide the method as defined above, additionally comprising a step of determining said ringtone from the number of calls from said identifier in said private log.

It is another object of the present invention to provide the method as defined above, additionally comprising a step of automatically activating at least one portion of said system at a predetermined time.

It is another object of the present invention to provide the method as defined above, additionally comprising a step of automatically activating at least one portion of said system after a predetermined time period has passed.

It is another object of the present invention to provide the method as defined above, additionally comprising a step of automatically activating at least one portion of said system at such time as said device is at a predetermined location.

It is another object of the present invention to provide the method as defined above, additionally comprising a step of automatically activating at least one portion of said system at such time as said device has left a predetermined location.

It is another object of the present invention to provide the method as defined above, additionally comprising a step of automatically activating at least one portion of said system at such time as said device is moving at a speed within a predetermined range.

It is another object of the present invention to provide the method as defined above, additionally comprising a step of automatically activating at least one portion of said system at such time as said device is moving at a speed outside said given range.

It is another object of the present invention to provide the method as defined above, additionally comprising a step of automatically activating at least one portion of said system at such time as said device is in a predetermined physical position.

It is another object of the present invention to provide the method as defined above, additionally comprising a step of automatically activating at least one portion of said system at such time as said device is in a physical position different from said predetermined physical position.

It is another object of the present invention to provide the method as defined above, additionally comprising a step of automatically deactivating at least one portion of said system at a predetermined time.

It is another object of the present invention to provide the method as defined above, additionally comprising a step of automatically deactivating at least one portion of said system after a predetermined time period has passed.

It is another object of the present invention to provide the method as defined above, additionally comprising a step of automatically deactivating at least one portion of said system at such time as said device is at a predetermined location.

It is another object of the present invention to provide the method as defined above, additionally comprising a step of automatically deactivating at least one portion of said system at such time as said device has left a predetermined location.

It is another object of the present invention to provide the method as defined above, additionally comprising a step of automatically deactivating at least one portion of said system at such time as said device is moving at a speed within a predetermined range.

It is another object of the present invention to provide the method as defined above, additionally comprising a step of automatically deactivating at least one portion of said system at such time as said device is moving at a speed outside said given range.

It is another object of the present invention to provide the method as defined above, additionally comprising a step of automatically deactivating at least one portion of said system at such time as said device is in a predetermined physical position.

It is another object of the present invention to provide the method as defined above, additionally comprising a step of automatically deactivating at least one portion of said system at such time as and said device is in a physical position different from said predetermined physical position; and any combination thereof.

BRIEF DESCRIPTION OF THE FIGURES

In order to better understand the invention and its implementation in practice, a plurality of embodiments will now be described, by way of non-limiting example only, with reference to the accompanying drawings, wherein.

DETAILED DESCRIPTION OF PREFERRED EMBODIMENTS

Figure 1A:
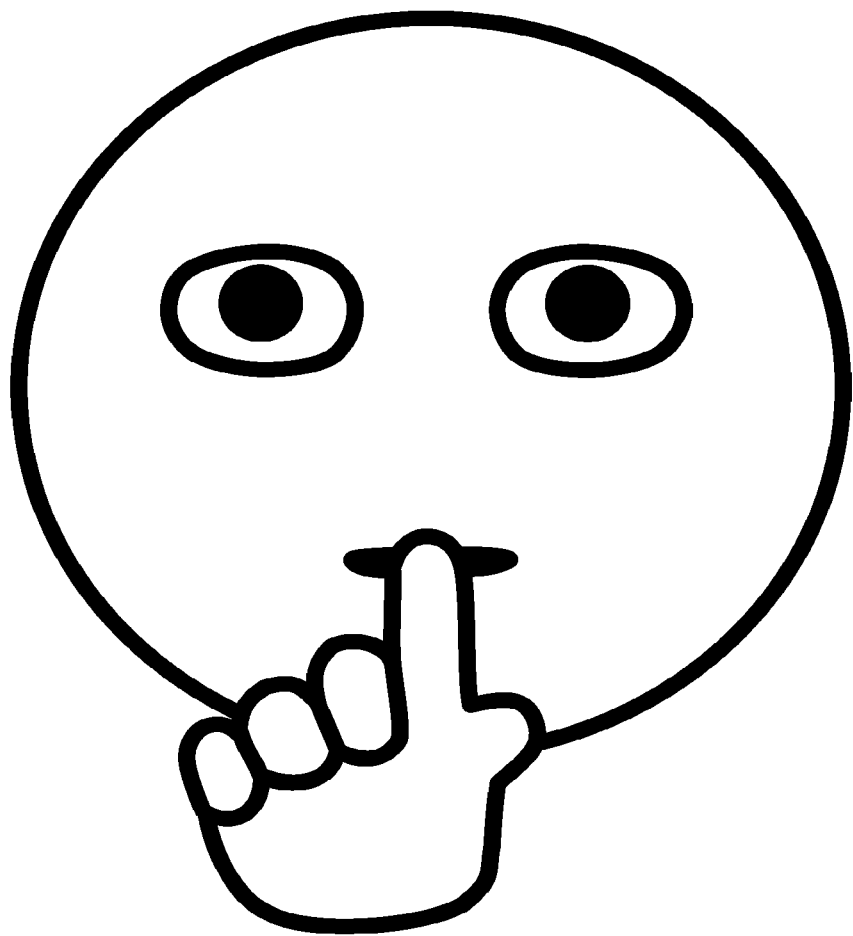
FIG. 1A is a schematic illustration of an icon indicating the presence of the system for managing and disabling phone ring tone profiles on a communication device.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for modifying the ringtone for an incoming call based on the existence of previous calls from the same caller.

It is one object of the present invention to provide a system for managing and disabling phone ring tone profiles, the system comprising:
a. a storage system comprising (a) a plurality of ringtones adapted to be activated when an incoming call is made; and, (b) at least one list of identified callers;
b. at least one processor to execute at least one data processing system, said at least one data processing system comprising:
 i. an acquiring module operable to read an identifier of said incoming call or an incoming message;
 ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
 iii. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;
 iv. an activation/deactivation module to activate or deactivate the system (a) at least one predetermined time, where the predetermined time can be acquired from at least one of (i) manual entry by a user, (ii) automatic acquisition from a source such as, but not limited to, a diary, (iii) at the conclusion of a predetermined delay time after either a manual or an automatic command to activate or deactivate, (b) when the device is moving at a speed in a predetermined range; or (c) when the device is in a predetermined position
wherein said disabling module of said system disables said ringtones if said number of calls having said same identifier within said predetermined period of time is less than a predetermined amount; further wherein said disabling module of said system disables said ringtones if said number of calls being made by said same caller within said predetermined period of time is less than a predetermined amount further wherein at least one of the following is being held true:
 a. said disabling module remains activated for a second predetermined period of time;
 b. said disabling module activates after a predetermined delay time such that, after activation, said activation or disabling of said ringtones commences upon completion of said predetermined delay time; and
 c. any combination thereof.

It is another object of the present invention to provide a method for managing and disabling phone ring tone profiles, comprising steps of:
a. providing a system comprising:
 i. a storage system comprising (a) a plurality of ringtones adapted to be activated when an incoming call is made; and, (b) at least one list of identified callers;
 ii. at least one processor to execute at least one data processing system, said at least one data processing system comprising:
  1. an acquiring module operable to read an identifier of an incoming call or an incoming message;
  2. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and 3. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;
b. receiving an incoming call;
c. identifying said identifier for said incoming call;
d. counting at least one selected from a group consisting of (a) calls from the same identifier; (b) calls made by the same caller;
e. disabling said ringtones if said number of calls having said same identifier within said predetermined period of time is less than a predetermined amount; or enabling said ringtones if said number of calls being made by said same caller within said predetermined period of time is no less than a predetermined amount.

It is another object of the present invention to provide a system for managing phone ring tone profiles, the system comprising:
a. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
b. at least one processor to execute at least one data processing system, said at least one data processing system comprising:
  i. an acquiring module operable to read an identifier of an incoming call or an incoming message;
  ii. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and
  iii. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof;
wherein said ring tone profile of said system is set to be said mute ring tone profile if said number of calls having said same identifier within said predetermined period of time is less than a predetermined amount; further wherein said ring tone profile of said system is set to be said second ring tone profile if said number of calls being made by said same caller within said predetermined period of time is greater than a predetermined amount.

It is another object of the present invention to provide a method for enabling a communication device to vary an incoming call notification signal comprising steps of:
a. providing a system comprising:
  i. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
  ii. at least one processor to execute at least one data processing system, said at least one data processing system comprising:
    1. an acquiring module operable to read an identifier of an incoming call or an incoming message,
    2. a detecting module operable to detect if the identifier exists in said at least one list in the system, to determine the caller from said list, and to detect how many incoming calls have been made within a predetermined period of time having at least one selected from a group consisting of (a) being made from the same identifier; (b) being made by the same caller; and
    3. a switching module operable to select the current ring tone from said plurality of stored ringtones according to at least one selected from a group consisting of (a) the number of calls by the same caller within said predetermined period of time; (b) the number of calls having the same identifier within said predetermined period of time, and any combination thereof
b. receiving an incoming call;
c. identifying said identifier for said incoming call;
d. counting at least one selected from a group consisting of (a) calls from the same identifier; (b) calls made by the same caller;
e. setting the current ringtone based on said number of calls, said current ringtone being said mute ringtone profile if said number of calls having either said same identifier or being made by said same caller, within said predetermined period of time, is less than a predetermined number and said current ringtone being said second ring tone profile if said number of calls having either said same identifier or being made by said same caller, within said predetermined period of time, is greater than a predetermined number.

The term 'ringtone' hereinafter refers to the signal that a communication is arriving. The signal need not be audible. For example, it can consist of, but is not limited to, a vibration, a visible signal, an audible signal, no signal at all, or any combination of these.

The term 'call', when used as a noun, hereinafter refers to a two-way communication between a caller and a recipient, wherein the caller and the recipient are not within earshot of each other. Examples of means used to transmit the conversation are, but are not limited to, a telephone, a two-way radio, and a walkie-talkie.

The term 'call', when used as a verb, hereinafter refers to an attempt by a caller to establish communication with a recipient, wherein the caller and the recipient are not within earshot of each other.

The term 'mute' hereinafter refers to refers to providing no signal that a call has been received that is perceptible beyond the receiving instrument. A call remains mute if the caller's identifier appears on a screen within the receiving instrument so that the user is aware that a call has been received only if the user is looking at the screen. A call is not mute if, for non-limiting examples, the instrument vibrates, or if a flashing light calls attention to that fact that a call is being received.

The term 'identifier' hereinafter refers to a code identifying from where the call is sent. An identifier can be, but is not limited to, a cell phone number, a landline number, an e-mail address, a Skype number, an SMS number, a what's up number, Viber, FaceTime, incoming communication, apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger With You, any communication software that uses internet, and any combination thereof.

The term 'communication device' refers hereinafter to any mobile device or any stationary device.

The term 'caller' hereinafter refers to the entity attempting to contact the recipient. A caller can have more than one identifier. For a non-limiting example, a caller can have a cell phone number, a Skype number, a what's up number, a landline number, Viber, FaceTime, incoming communication, apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger with You, any communication software that uses internet, and any combination thereof.

In the system of the present invention, the signal that a communication is arriving (the ringtone) depends not only on the ringtone chosen by the recipient of the call and the type of message, as is standard in telephony today, but also is enabled to depend on the relationship of the current call to previous calls by the same caller or from the same identifier.

The system of the present invention consists of a differentiated series of responses to a series of calls from a given caller. In a preferred embodiment, the system is embodied by a data processing system enabled to be modify the ringtone of a telephone, preferably a portable telephone, of the variety referred to as a cell phone or a mobile phone.

In a preferred embodiment, the series consists of two responses. The first at least one call from a caller is mute so that the attention of the recipient will not be drawn to the incoming call. The recipient is notified of the second at least one call from the same caller by a ringtone, preferably the current ringtone set in the telephone.

The term "graduated series" refers hereinafter to a group of ringtones, with each ringtone different from the others in at least one of type or loudness. The different ringtones are used consistently, with one being used for a first predetermined number of calls, the second for the second predetermined number of calls, and so on. In the examples given here, for clarity, each step in the graduated series will consist of one call although other numbers of calls are possible. In the preferred graduated series, the first call is mute, with subsequent calls using the instrument's current ringtone. In another example, the first call is mute, with the next call producing a vibration of the instrument but no sound, and subsequent calls use the instrument's current ringtone. In yet another example, the first call is mute, with the next call producing a vibration of the instrument but no sound, the third call uses the current ringtone at a low volume, with each subsequent call within the predetermined time using a louder ringtone. Many other examples will be obvious.

In some embodiments, the series is a graduated series, where the first at least one call from a caller is mute so that the attention of the recipient will not be drawn to the incoming call. The recipient is notified of a second at least one call from the same caller by a vibratory response, which may be silent or may be accompanied by a discreet buzzing.

In some embodiments, there is a graduated series of further calls. In some of those embodiments, the third at least one call will elicit a ringtone, and subsequent at least one calls elicit the same ringtone, but with an increasing volume.

In other embodiments of the graduated series, the third and subsequent at least one calls elicit different ringtones, so that a recipient can determine how many times the caller has been trying to make contact.

In preferred embodiments, it is the absolute number of calls within a predetermined time that determines progression in the ringtone series; the time elapsed between calls is not taken into account. In other embodiments, the frequency of calls determines progression in the ringtone series; for example, a third call within twice the predetermined time will elicit a vibratory signal, while a third call after twice the predetermined time will be mute. In a preferred embodiment, the predetermined time is about 5 minutes.

In a preferred embodiment of the system, each identifier is assigned to a category, where the categories are selected from the group consisting of: "always mute" and "graduated series". In some embodiments, the group also includes "always signaled".

In some embodiments of the system, each caller is assigned to a category, where the categories are selected from the group consisting of: "always mute" and "graduated series". In a variant of this embodiment, the group also includes "always signaled".

In an embodiment of the system, calls can be differentiated by type of caller, for example, types of caller such as, but not limited to, what's up, Skype, SMS, notification of new information, advertisement, call connected to job, call from friend, call from family, call from business not connected to job (for non-limiting example, call from car repair shop) call from members of a contact list, and call from identifiers not on any contact list. In this embodiment, for a given grouping of caller, the recipient chooses whether a call from the caller is signaled for all calls, is signaled for no calls, or whether the graduated series of signal is used. As an illustrative example, a recipient specifies that, for what's up and SMS calls, the call is never signaled. For calls from persons not on a contact list, the graduated series of signals is used. For all other calls, the default (call is always signaled) is used.

In some embodiments, times can be set so that predetermined types of caller can be assigned to different categories according to time. For non-limiting example, calls connected to the job can be automatically assigned to the category of "always signaled" during working hours, "graduated series" between working hours and 10 PM and "always mute" between 10 PM and 8 AM. In another non-limiting example, calls from friends can be automatically assigned to "always mute" during working hours, "graduated series" between working hours and 10 PM and "always mute" between 10 PM and 8 AM, whereas, for non-limiting example, calls from family can be automatically assigned to "graduated series" during working hours, "always signaled" between working hours and 10 PM and "graduated series" between 10 PM and 8 AM. many other examples will be obvious to one skilled in the art.

For the graduated series of calls, the ringtone will change after N calls, where N is an integer greater than or equal to 1. In preferred embodiments, the default value of N is 1.

In a preferred embodiment, presence of the system in a communication device such as a cellphone is shown by an icon. An embodiment of such an icon is illustrated in FIG. 1A.

In a preferred embodiment, pressing and releasing the icon toggles between activating the system and deactivating the system. In preferred embodiments, pressing and holding the icon enables the user to set parameters of the system such as, but not limited to, the maximum time between calls in a series, the frequency of calls, the maximum time for which a call may be counted a part of a series, whether a grouping of call uses the graduated series, whether a grouping of call is always signaled, whether a grouping of call is ignored by the system, whether a grouping of call is always mute, the type of signal used for each call in the series, the individual signal used for a given call in the series, individual identifiers that are always to be signaled, individual identifiers for which the graduated series is to be used, individual identifiers which are always mute, individual callers that are always to be signaled, individual callers for which the graduated series is to be used, individual callers which are always mute, treatment of identifiers belonging to no grouping, and new groupings of call.

In an embodiment, access to at least some part of the system of the present invention is enabled from other sections of the telephone command system. An example, but not the only example, of such another section is "shortcuts".

In some embodiments, a call may belong to more than one grouping. For example, a caller who is on a list of "friends" may contact a recipient via Skype. In this example, calls from members of the "friends" list are always signaled; Skype calls are signaled using the graduated series of signals. In preferred embodiments, if a call is a member of at least one list that is always signaled, the call will always be signaled. In other embodiments, if a call is a member of at least one list that is to be signaled via the graduated series, the call will be signaled via the graduated series.

In an embodiment of the system, the method used to determine the existence of previous calls may differ for different categories of call. For non-limiting examples, for a telephone which log calls, the system can check the internal telephone log for timing information; for what's up, the system can check what previous inquiries were sent to the recipient's identifier; and for Skype, the call log will be checked.

In embodiments enabled to ignore a grouping of calls, if a call is a member of a grouping classified as "ignored", membership in said grouping does not affect how the incoming call is signaled.

In a preferred embodiment, if the caller's identifier does not appear in at least one list of known identifiers, the call will always be mute.

In some embodiments, the checks are made against the identifier of a given call. In other embodiments, the checks are made against the caller. In embodiments where the checks are made against the identifier, no check is made of the identity of the caller. If a given caller calls, within the predetermined time, once via Skype, the second time via a landline and the third time via a cell phone, each of the calls is mute. However, if the check is made against the caller, if the graduated series is used, the second call will be signaled by a vibratory tone, while the third call will be signaled by a ringtone.

In some embodiments, for at least one stored identifier, the system will store the grouping against which the identifier is to be checked. For example, a given identifier may be identified as "friend" so that the signal will always follow the "friend" signaling rule even if the call is carried on Skype and the instrument is set to "graduated series" for Skype calls and to "graduated series" if any grouping is "graduated series".

Figure 1B:
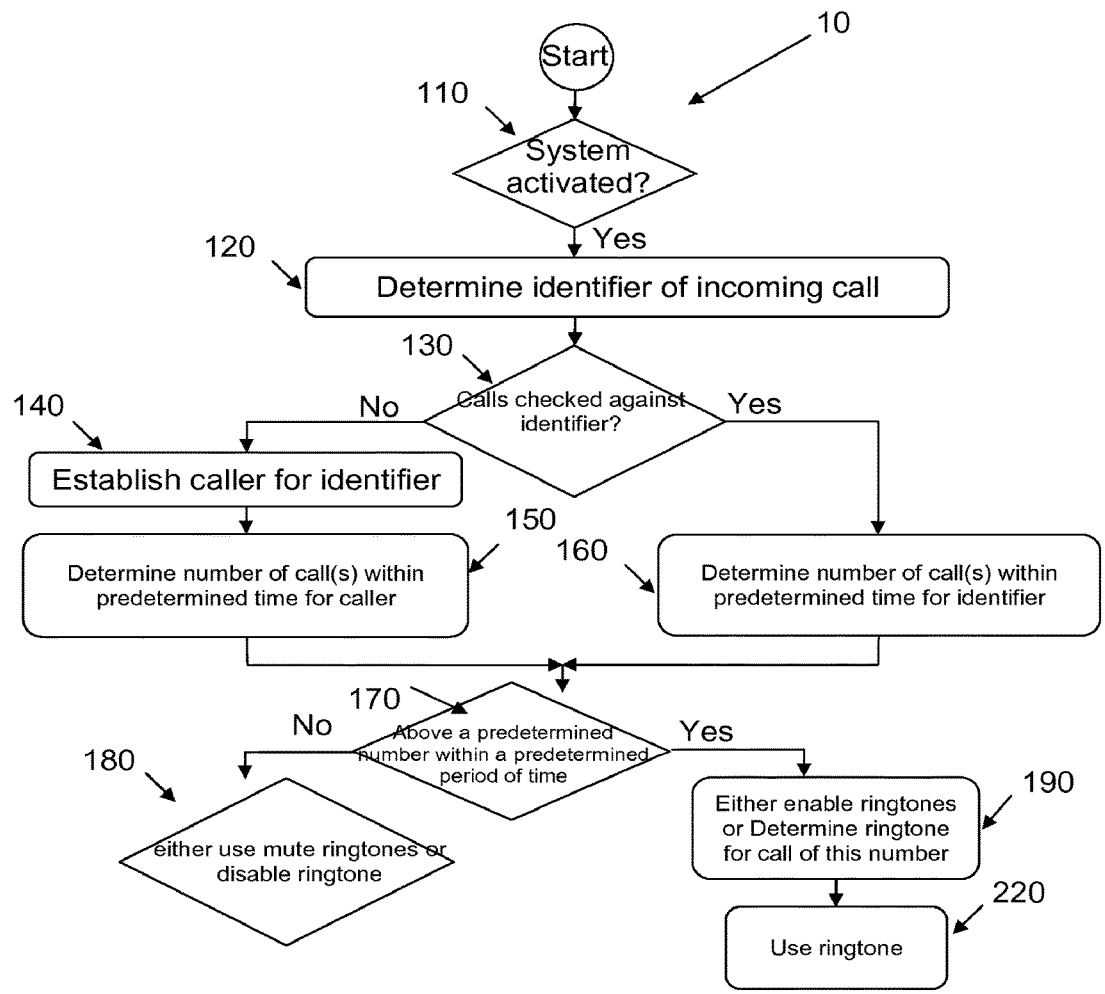
FIG. 1B is schematic flowchart of one embodiment of the method of managing and disabling phone ring tone profiles.

Reference is now made to FIG. 1B illustrating a preferred embodiment of the system and method of the present invention.

FIG. 1B illustrates a flow chart showing an embodiment of a method (10) for managing phone ring tone profiles. In this embodiment, when a call arrives, the phone checks if the system is activated (110). If the phone is activated, the system determines the identifier of the incoming call—the unique number or other identification of the instrument which sent the call. The system then checks whether the number of calls is to be determined (130) for the identifier or for the owner of the identifier—the caller who wishes to establish communication. If the number of calls is to be determined for the identifier, then the system determines, as described hereinabove, the number of calls within the predetermined time, with that identifier (160). If the number of calls is to be checked for the caller, then the caller, the owner of the identifier, is found (140) from at least one list comprising callers and the identifiers belonging to the callers. Once the caller is found for the identifier, the number of calls from that caller is found (150), by checking all of the identifiers associated with that caller. If the total number of calls within the predetermined time (170) is below a predetermined number, then either the phone's mute ringtone is used or ringtones are disabled, the recipient of the call can see on the instrument's screen (if there is one) that a call has arrived, but no other signal of the arrival of a call is given (180). If the total number of calls within the predetermined time (170) is above the predetermined number, then either ringtones are enabled or, if different ringtones are used for calls of different numbers, the ringtone for this call is determined and enabled (190), and the chosen ringtone for a call of this number is used (200).

As mentioned above, the present invention provides a method (10) for managing and disabling phone ring tone profiles, the method comprising steps of
  a. providing a system comprising:
    i. a storage system comprising (a) a plurality of ringtones adapted to be activated when an incoming call is made; and, (b) at least one list of identified callers;
    ii. at least one processor to execute at least one data processing system, said at least one data processing system comprising:
      1. an acquiring module operable to read an identifier of an incoming call or an incoming message;
      2. a detecting module operable to detect if the identifier exists in said at least one list in the system, to determine the caller from said list, and to detect how many incoming calls have been made within a predetermined period of time having at least one selected from a group consisting of (a) being made from the same identifier, (b) being made by the same caller; and,
      3. a disabling module adapted to either activate or disable said ringtones according to at least one selected from a group consisting of (a) the number of calls by the same caller within said predetermined period of time; (b) the number of calls having the same identifier within said predetermined period of time; and any combination thereof;
      4. an activation/deactivation module to activate or deactivate the system (a) at least one predetermined time, where the predetermined time can be acquired from at least one of (i) manual entry by a user, (ii) automatic acquisition from a source such as, but not limited to, a diary, (iii) at the conclusion of a predetermined delay time after either a manual or an automatic command to activate or deactivate, (b) when the device is moving at a speed in a predetermined range; or (c) when the device is in a predetermined position;

b. activating or deactivating the system for at least one category of caller (see step 105);
c. activate/deactivate the system and, if the system is activated (see step 110), receiving an incoming call;
d. identifying said identifier for said incoming call (see step 120);
e. if no identification is made, establishing a caller for said identifier (see step 140);
f. counting/determining at least one selected from a group consisting of (a) calls from the same identifier; (b) calls made by the same caller (see steps 150 and 160);
g. disabling said ringtones if said number of calls having said same identifier within said predetermined period of time is less than a predetermined amount; or enabling said ringtones if said number of calls being made by said same caller within said predetermined period of time is no less than a predetermined amount (see steps 170, 180, 190 and 220).

As also disclosed above, it is another object of the present invention to provide a method (10) for enabling a communication device to vary an incoming call notification signal. The method comprising steps of:
a. providing a system comprising:
 i. a storage system comprising (a) a plurality of ringtones; at least one of which is a mute ring tone profile of the system and at least one second ring tone profile of the system; said at least one second ring tone profile of the system is substantially different from said mute ring tone profile; and, (b) at least one list of identified callers;
 ii. at least one processor to execute at least one data processing system, said at least one data processing system comprising:
  1. an acquiring module operable to read an identifier of an incoming call or an incoming message;
  2. a detecting module operable to detect if the identifier exists in said at least one list in the system, to determine the caller from said list, and to detect how many incoming calls have been made within a predetermined period of time having at least one selected from a group consisting of (a) being made from the same identifier; (b) being made by the same caller; and
  3. a switching module operable to select the current ring tone from said plurality of stored ringtones according to at least one selected from a group consisting of (a) the number of calls by the same caller within said predetermined period of time; (b) the number of calls having the same identifier within said predetermined period of time; and any combination thereof
  5. an activation/deactivation module to activate or deactivate the system (a) at least one predetermined time, where the predetermined time can be acquired from at least one of (i) manual entry by a user, (ii) automatic acquisition from a source such as, but not limited to, a diary, (iii) at the conclusion of a predetermined delay time after either a manual or an automatic command to activate or deactivate, (b) when the device is moving at a speed in a predetermined range; or (c) when the device is in a predetermined position;
b. activating or deactivating the system for at least one category of caller (see step 105);
c. activate/deactivate the system and, if the system is activated (see step 110), receiving an incoming call;
d. identifying said identifier for said incoming call (see step 120);
e. if no identification is made, establishing a caller for said identifier (see step 140);
f. counting at least one selected from a group consisting of (a) calls from the same identifier; (b) calls made by the same caller (see steps 150 and 160);
g. setting the current ringtone based on said number of calls, said current ringtone being said mute ringtone profile if said number of calls having either said same identifier or being made by said same caller, within said predetermined period of time, is less than a predetermined number and said current ringtone being said second ring tone profile if said number of calls having either said same identifier or being made by said same caller, within said predetermined period of time, is greater than a predetermined number (see steps 170, 180, 190 and 220).

Figure 2:
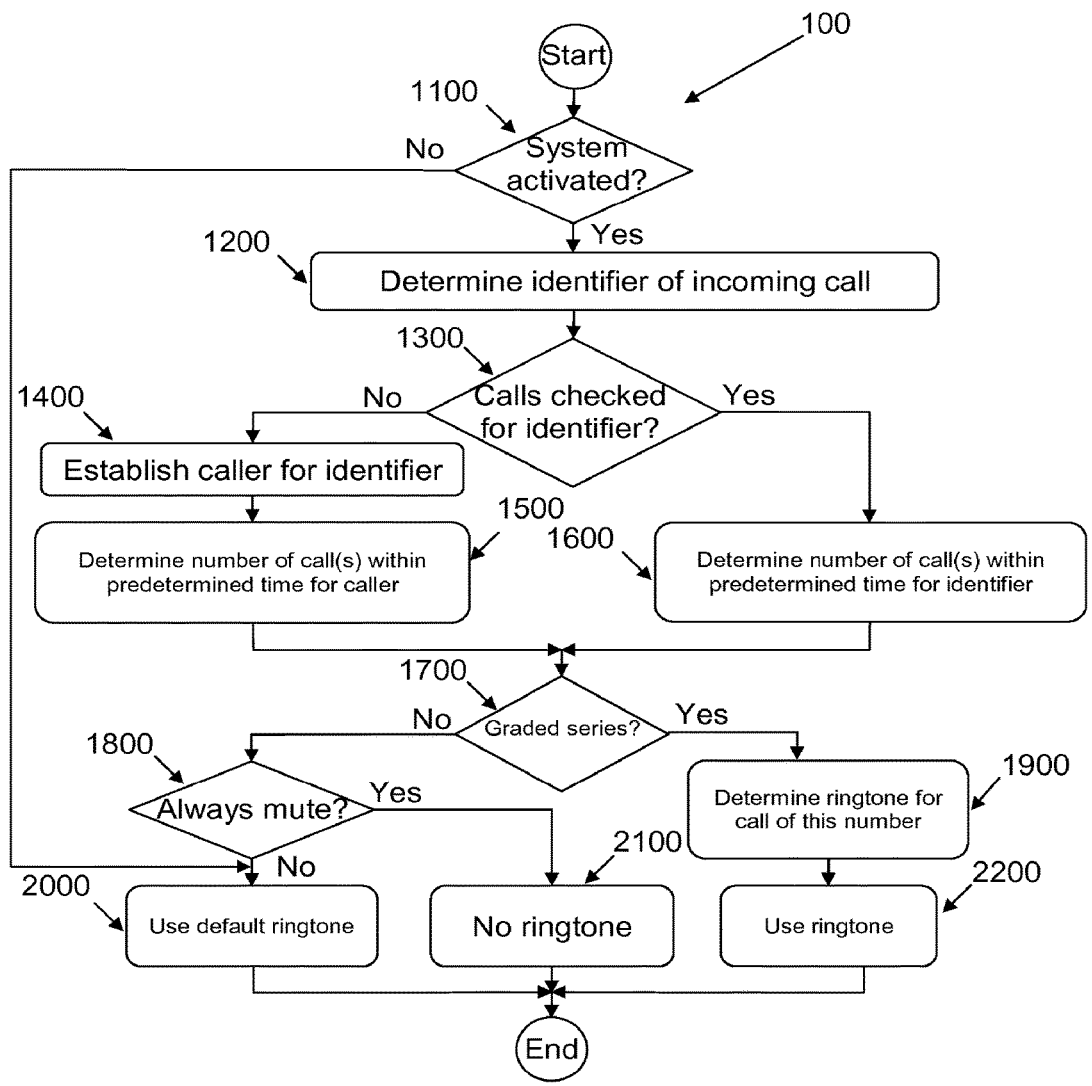
FIG. 2 is schematic flowchart of another embodiment of the method of managing and disabling phone ring tone profiles.

FIG. 2 illustrates a flow chart (100) of a preferred embodiment of a method of implementing the system. In this embodiment, when a call arrives, it is checked whether or not the system of this invention is activated (1100). If the system is not activated, then the default ringtone for this identifier set by the receiving instrument is used (2100).

If the system is activated (1100), the identifier for the incoming call is determined (1200). If the number of calls within the predetermined time is to be checked for the identifier (1300), the number of calls within the predetermined time from that identifier is found (1600). In the case that the number of calls is checked for the caller, not the identifier, the caller for that identifier is established (1400) and the number of calls from that caller within the predetermined time is found (1500).

Once the number of calls is known, it is checked whether the graduated series is to be used (1700). If it is, the ringtone is determined for that number of calls (1900), and the appropriate ringtone is used to signal the call (2200). If the graduated series is not to be used (1700), and the call is "always mute" (1800), the call is mute (2100); no ringtone is used. If the call is not "always mute" (1800), the default ringtone set by the receiving instrument is used (2000).

Figure 3A:
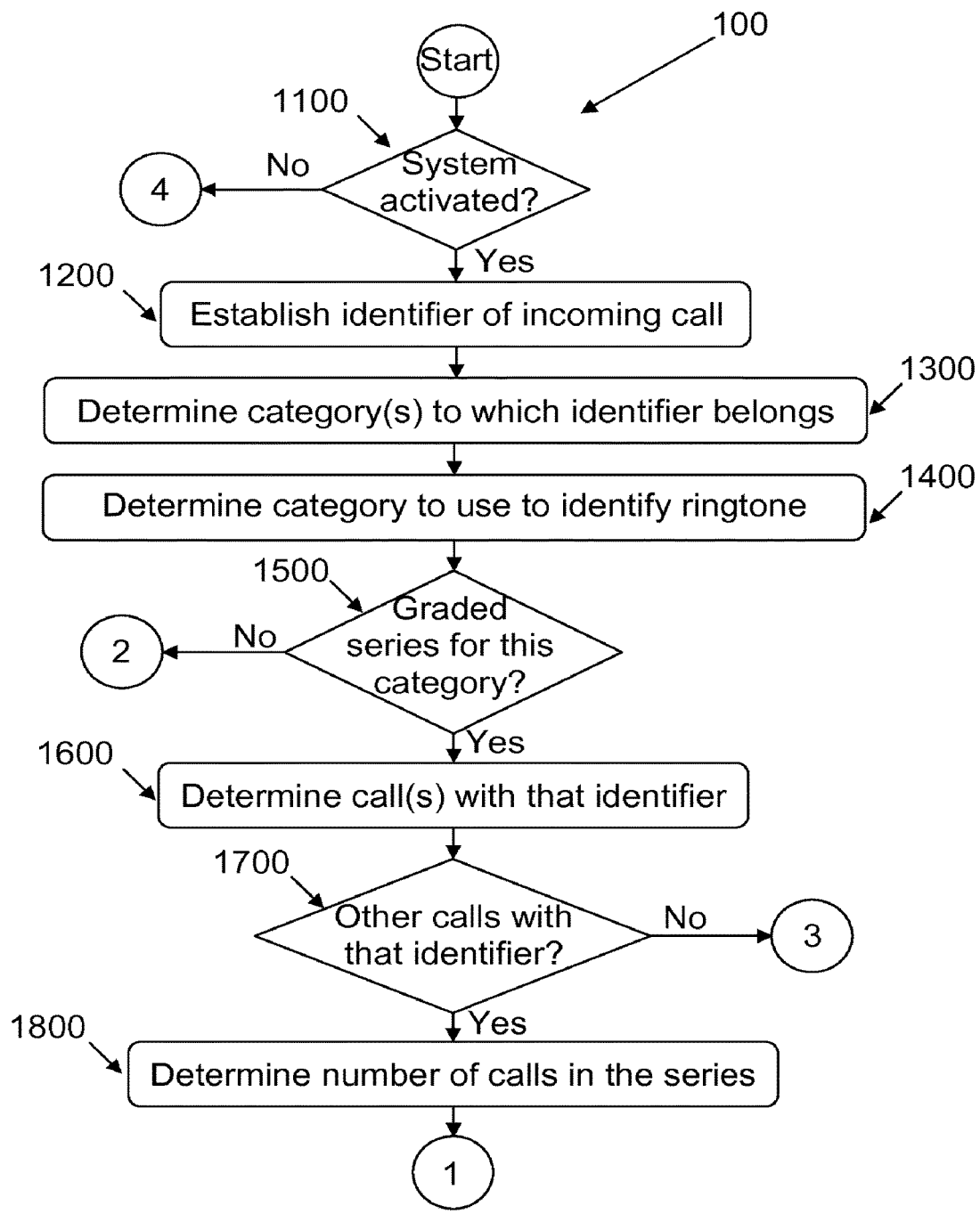
FIG. 3A is schematic flowchart of yet another embodiment of the method of managing and disabling phone ring tone profiles.
Figure 3B:
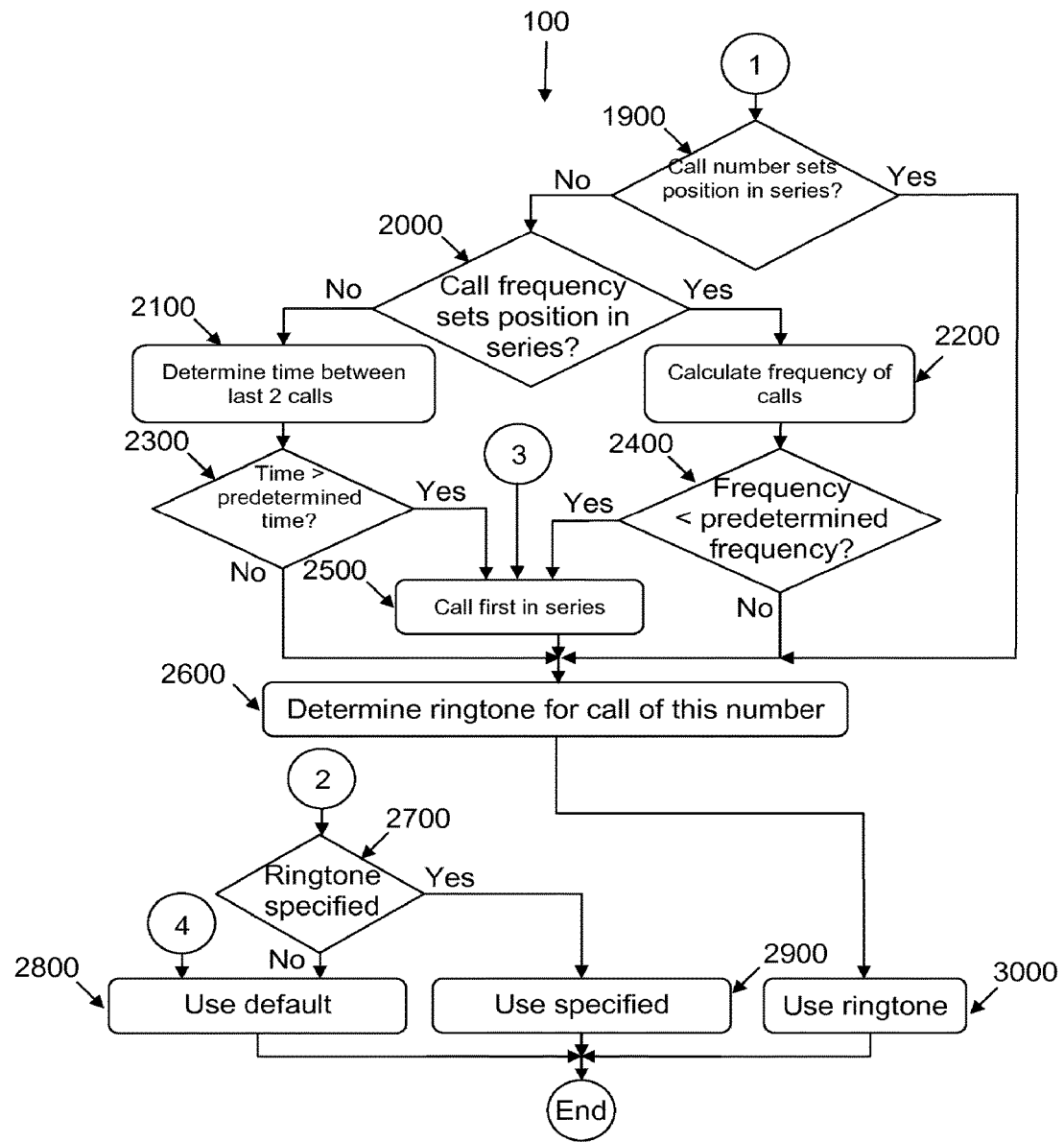
FIG. 3B is schematic flowchart of still another embodiment of the method of managing and disabling phone ring tone profiles.

FIGS. 3A and 3A illustrate a flow chart (100) of another embodiment of a method of implementing the system. It is noted that the first portion of the flow chart (100), shown in FIG. 3A, forms a continuum with the second portion of the flow chart (100), shown in FIG. 3B, via interconnectors (1) to (4). In this embodiment, when a call arrives, it is checked whether or not the system of this invention is activated (1100), as shown in FIG. 3B. If the system is not activated, then via interconnector (4) the default ringtone for this identifier set by the receiving instrument is used (2800), as shown in FIG. 3B.

If the system is activated (1100), the identifier for the incoming call is determined (1200), the categories to which that identifier belongs are found (1300), and the grouping is identified which will determine the type of ringtone (1400). If a graduated series is not used for calls in this grouping (1500), then the identifier is checked as to whether a specified ringtone is to be used for this identifier (2700). Non-limiting examples of specified ringtones are "always mute", a ringtone unique to a given identifier such as a ringtone identifying a call from one's spouse, a "friend" ringtone, and a "business call" ringtone. If a ringtone has been specified for this identifier, it is used (2900). If no ringtone has been specified, the default ringtone set by the receiving instrument is used (2800).

If a graduated series is used (1500), then the appropriate list (phone log, group log, or other as appropriate) is checked and all calls with that identifier are found (1600). If there are no other calls with that identifier (1700) then this is the first call from that identifier (2500), the appropriate ringtone for a first call is determined (2600) and used (3000). In a preferred embodiment, as a first call, it will be mute.

If there are other calls with this identifier (1700), the number of calls with that identifier is determined (1800). In a preferred embodiment, this is the number of calls within a predetermined time, for a non-limiting example, the number of calls within the last hour.

If the number of calls received from a given identifier determines the type of ringtone (1900) then the ringtone for that number of calls is chosen (2600) and used (3000). If the call frequency determines the type of ringtone (2000), then the call frequency is calculated (2200) from the number of calls and the time elapsed since the first call in the series, and this frequency is compared to a predetermined frequency (2400). If the frequency is less than a predetermined frequency, then the call is effectively the first of a series (2500), the appropriate ringtone for a first call is specified (2600) and used (3000). In a preferred embodiment, as a first call, it will be mute.

If the frequency is greater than the predetermined frequency (2400), then the ringtone for a call at that position in the graduated series is specified (2600) and used (3000).

If the call frequency does not set the position in the graduated series (2200), then the time between calls sets the position in the graduated series, and the time elapsed since the previous call is determined (2100). If the time elapsed is greater than a predetermined time (2300), then the call is effectively the first of a series (2500), the appropriate ringtone for a first call is specified (2600) and used (3000). In a preferred embodiment, as a first call, it will be mute.

If the time elapsed is less than a predetermined time, then the ringtone for a call at that position in the graduated series is specified (2600) and used (3000).

In some embodiments, the user can specify at least one time period during which the system for disabling phone ring tone profiles is automatically activated, with the time period specified by at least two of a group consisting of: a start time, an end time and duration. If all three are entered, the system will check for consistency and warn the user if the duration is not equal to the end time minus the start time.

Non-limiting examples of such time periods can include, but are not limited to, normal working hours, scheduled prayer time, time of regularly scheduled meetings, meal times or sleeping times.

In some embodiments, the user can specify at least one time period during which the system for disabling phone ring tone profiles is automatically deactivated, with the time period specified by at least two of a group consisting of: a start time, an end time and duration. Non-limiting examples of such time periods can include, but are not limited to, normal working hours, scheduled prayer time, time of regularly scheduled meetings, meal times or sleeping times.

In some embodiments, activation can occur a predetermined delay time after activation is requested. For non-limiting example, a user prefers to have the phone on "graduated series" for friends and family at night, from the time he goes to sleep until the time he wakes up. For convenience, he sets the phone to "graduated series" when he gets into bed. However, he normally reads in bed for 20 minutes before he goes to sleep, so is willing to accept calls during that 20 minutes. In such a case, he can set the phone to "graduated series" for friends and family for the next 8 hours when he goes to bed. He also sets the system for a delay time of 20 minutes so that "graduated series" for friends and family actually activates 20 minutes later.

In some embodiments, the delay time is preset, so that, when he sets the system for "graduated series" for friends and family, it automatically waits the delay time of 20 minutes before activating.

Many other examples will be obvious to one skilled in the art.

In some embodiments, the system reduces, rather than increases, the obtrusiveness of a call in a decreasing graduated series. In such embodiments, if the number of calls having the same identifier within a predetermined period of time is less than a predetermined amount, a default ring tone profile is used. If the number of calls is more than at least one predetermined amount but less than at least one other predetermined amount, at least one second predetermined ringtone profile is used. If the number of calls is more than the largest second predetermined amount and less than a third predetermined amount, a vibratory signal is used, which can be accompanied by a discreet buzzing, and, if the number of calls is more than the third predetermined amount, the phone is mute.

The predetermined ringtones can be different volume ringtones, with the volume decreasing with the number of calls, or different types of ringtone. As disclosed above, in some embodiments, the user can select the ringtones to be used.

The ringtone can be selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof In some embodiments, the system can automatically activate or deactivate according to the network to which the device is connected. For example, the device can automatically activate a decreasing series of alerts when the device is connected to a home internet system, activate an increasing series of alerts when the device is connected to a work internet system, or deactivate when no internet system is present. Obviously, different types of caller can be assigned to different categories, with the category differing by type of internet system. For non-limiting example, connection to a work internet system can automatically activate an increasing graduated series for job-related callers and a decreasing graduated series for friends.

In some embodiments, the system can automatically activate or deactivate based on the location of the device. Examples of types of location include, but are not limited to, work, private home, theater, shopping mall, place of worship, sports hall, and sporting arena. It is obvious that activation or deactivation based on location can also be based on type of caller or category of response.

In some embodiments of the system, the parts of the system modifiable by a user are divided into at least two sections. In some embodiments, the two parts may be labeled "standard" and "advanced". In the "standard" section, the user may alter the method of determining position in a series (call frequency, time between calls, or number of calls), (default is time since previous call); and the times (maximum time an identifier may be used, time between calls to be used, frequency of calls), (default is 5 minutes between calls and 2 hours for maximum time an identifier remains part of a series); and assigning individual identifiers to categories. In the "advanced" section, the user may specify the hierarchy of categories (default is "always signaled" outweighs "graduated series", which outweighs "always mute"); whether each caller is assigned a grouping (default) or whether all categories are checked for each identifier; "always mute" for callers not in any contact list (default is "off"), callers in a "white list" of "always signaled" (default is "none"), which categories are ON (default is all ON).

In a preferred embodiment, the system has default values for all user-adjustable parameters, said default values adapted to provide the user with a readily-usable and convenient system, and said default values included in the system at installation.

In a preferred embodiment, the system includes a "reset all" function such that, when activated, all user-adjustable parameters return to their default values.

In a preferred embodiment, pressing and releasing the icon (FIG. 1A) toggles between activating the system and deactivating the system. In some embodiments, pressing and holding the icon enables the user to set parameters of the system such as, but not limited to, the maximum time between calls in a series, the frequency of calls, the maximum time for which a call is counted a part of a series, whether a grouping of call uses the graduated series, whether a grouping of call is always signaled, whether a grouping of call is ignored by the system, whether a grouping of call is always mute, the type of signal used for each call in the series, the individual signal used for a given call in the series, individual identifiers that are always to be signaled, individual identifiers for which the graduated series is to be used, individual identifiers which are always mute, individual callers that are always to be signaled, individual callers for which the graduated series is to be used, individual callers which are always mute, treatment of identifiers belonging to no grouping, and new groupings of call.

In preferred embodiments, pressing and holding the icon activates a screen which enables the user to set simple parameters such as, but not limited to,
(1) the maximum time for which a call is counted as part of a series (default: 5 minutes), and
(2) the number of calls for each step in the progression (default: 1).

In some embodiments, this screen also enables the user to activate another screen which enables the user to set advanced parameters.

In other embodiments, access to the "advanced settings" screen is via another section of the telephone, such as an "advanced settings" screen which is part of a factory-installed data processing system of the instrument or via a "shortcut" button.

The "advanced settings" screen enables the user to alter parameters such as, but not limited to,
(1) whether progression in the series depends on (a) the maximum time for which a call is counted as part of a series (default) or (b) the frequency of the calls and, if (a), the maximum time for which a call is counted as part of a series (default: 5 minutes);
(2) whether calls are checked by caller (default), no matter what identifier or channel is used, or by identifier, independent of the caller;
(3) whether calls from callers or identifiers not on any list of callers or identifiers are always mute (default);
(4) whether a two-step, three-step or multi-step graduated series is active (default: 2-step); and
(5) setting a time at which the applications starts automatically and/or a time at which the application shuts down automatically (default: no times set).

In preferred embodiments, the first call from a particular caller is mute. A second call within the predetermined time is signaled, independent of the identifier of the call or the channel used to make the call (Whatsapp, Skype, SMS, landline, e-mail, cellphone).

In preferred embodiments, the predetermined time is 5 minutes.

In preferred embodiments, each channel is checked as to whether there has been a call from the caller on that channel within the predetermined time. The method of checking may differ between channels. For non-limiting examples, the telephone's internal log can be checked for landline and cellphone calls, what's up can be checked for previous enquiries, and the Skype call log can be checked for Skype calls.

In a preferred embodiment, calls are checked against the caller, so that if a caller has several identifiers, a second call by that caller via any channel is counted as a second call. For example, the first call may be via a landline and the second via Skype. In a preferred embodiment, this second call will elicit the current ringtone for the instrument, not the mute ringtone of a first call.

In some embodiments, the system of the present invention keeps a private log of calls which have arrived within the predetermined time, listing said calls by caller. In this embodiment, when a call arrives, the system identifies the caller, adds the call to the private log, starts a timer, and uses said private log to find the number of calls from said caller and, from said number of calls, determines the appropriate ringtone. Using the time, the system determines how long a call has been in the private log and, after a call has been in the private log for more than the predetermined time, it is removed from the private log.

In some embodiments, the system of the present invention keeps a private log of calls which have arrived within the predetermined time, listing said calls by identifier. In this embodiment, when a call arrives, adds the call to the private log, starts a timer, and uses said private log to find the number of calls from said caller and, from said number of calls, determines the appropriate ringtone. Using the time, the system determines how long a call has been in the private log and, after a call has been in the private log for more than the predetermined time, it is removed from the private log.

In some embodiments, the steps in the graduated series are indicated by at least one graphical element. In some variants of these embodiments, there is a single graphical element for the graduated series. In some variants, each step has its own graphical element. In some variants, a single graphical element indicates the graduated series; selection of this graphical element generates a display comprising a graphical element for each step in the series.

In some embodiments with a graphical element for each step, the nature of the graphical element indicates the nature of the step. For non-limiting example, an icon of a face can indicate a mute ringtone, an icon of an activated alarm clock can indicate a vibratory tone, an icon of a bell can indicate a single-note ringtone, while an icon of a musical note indicates that the ringtone is a tune.

In some embodiments, a user can select the nature of a step via the advanced screen. For non-limiting example, when different ringtones are used for different steps in the series, the user can select the ringtone to be used for each step in the ringtone series.

In some embodiments, the system can automatically activate or deactivate based on the speed of movement of the device. For non-limiting example, the device can automatically activate "always mute" if the device is moving at a speed greater than 10 mph, indicating that the user is driving a vehicle.

In some embodiments, the deactivation module can be automatically activated if the device is placed in a predetermined position. For non-limiting examples, calls automatically become "always mute" when a device is placed horizontal with the view-screen facing downward (face downward on a table), with calls reverting to previous categories when the device is moved; or calls automatically become "always ring" when the device is placed in a vertical position (carried in a shirt pocket).

In some embodiments, the system can communicate with one or more diaries, either stored within the device or accessible to the device. In such embodiments, the device can be synchronized with the diary, either automatically or manually. For non-limiting example, the device can be set to automatically activate "always mute" at the time scheduled in a diary as "meeting with a client", with the device automatically reverting to previous settings at the time indicated in the diary as the end of the meeting.

In some variants of these embodiments, the device can be set to activate at a predetermined time before or after the scheduled start of an event and to deactivate (or return to previous settings) at a second predetermined time after or before the scheduled end of the event. For non-limiting examples, the device can automatically activate "always mute" 5 minutes before the scheduled start of a meeting, and automatically activate "always ring for job-related callers" 10 minutes after the scheduled end of the meeting; or the device can activate "always mute" 5 minutes after the scheduled start of a theatrical performance (since it was known that such performances always start late) and activate "always ring" 5 minutes before the scheduled end, since ringing phones do not disturb an audience during the after-performance applause. Other combinations, including activation with no deactivation, will be obvious to one skilled in the art.

It should be noted that any of the above embodiments can be combined, in any manner.

The invention claimed is:

1. A mobile telecommunication device comprising:
   a. a memory configured to store a plurality of tones for being activated when an incoming communication is received and a list of stored caller identities, said caller identity records including at least one member selected from the group consisting of: a caller identifier and caller number;
   b. a processor configured to execute a set of programming instructions, said programming instructions when executed by the processor causing the processor to:
      i. receive an incoming caller identity parameter associated with an incoming communication to the mobile telecommunication device;
      ii. detect whether the caller identity parameter is stored on said list of stored caller identities;
      iii. determine how many incoming communications have been received from the incoming caller within a predetermined period of time, upon detecting that the caller identity parameter is stored on said list of stored caller identities;
      iv. activate at least one of said ringtones for said incoming communication, upon determining that the number of incoming communications received from the incoming caller within said predetermined period of time exceeds a threshold, and
      v. disable said ringtones for said incoming communication, upon determining that the number of incoming communications received from the incoming caller within said predetermined period of time does not exceed said threshold.

2. The mobile telecommunication device according to claim 1, wherein at least one of the following is being held true (a) said identifier is the caller number; said identifier is selected from a group consisting of: a cell phone number, a landline number, an e-mail address, a Skype number, an SMS number, a what's up number, Viber, FaceTime, incoming communication, Apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger With You, any communication software that uses internet, and any combination thereof; (b) said system further comprising a setting module operable to provide a user interface for the system; (c) said ringtone is selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof; (d) said processor is configured to select said ringtone based on at least one member selected from a group consisting of: the frequency of said incoming communications, the number of said incoming communications, the number of said incoming communications within a given time, the time since the last incoming communication, any combination thereof; and (e) any combination thereof.

3. The mobile telecommunication device according to claim 1 wherein at least one of the following is being held true: (a) the first at least one call, in a predetermined period of time, from a given caller or identifier is mute, the second at least one call is signaled by a vibratory signal, and the third and subsequent at least one calls are signaled by a ringtone, with the volume of the ringtone increasing with each call; (b) the first at least one call, in a predetermined period of time, from a given caller or identifier is mute, the second at least one call is signaled by a vibratory signal, and the third and subsequent at least one calls are signaled by ringtones, with the ringtones differing for each call in the series; (c) the first at least one call, in a predetermined period of time, from a given caller or identifier is mute, the second at least one call is signaled by a vibratory signal, and the third and subsequent at least one calls are signaled by the same ringtone; (d) the first at least one call, in a predetermined period of time, from a given caller or identifier is mute, the second and subsequent at least one calls are signaled by a ringtone, with the volume of the ringtone increasing with each call; (e) the first at least one call, in a predetermined period of time, from a given caller or identifier is mute, the second and subsequent at least one calls are signaled by ringtones, with the ringtones differing for each call in the series; (f) the first at least one call, in a predetermined period of time, from a given caller or identifier is mute, the second and subsequent at least one calls are signaled by the same ringtone; (g) the first at least one call, in a predetermined period of time, from a given caller or identifier is signaled by a ringtone, with the ringtone volume decreasing with each call, the second at least one call is signaled by a vibratory signal, and the third at least one call is mute; (h) the first at least one call, in a predetermined period of time, from a given caller or identifier is signaled by a ringtone, with the ringtones differing for each call in the series, the second at least one call is signaled by a vibratory signal and subsequent at least one calls are mute; (i) the first at least one call, in a predetermined period of time, from a given caller or identifier is signaled by the same ringtone, second at least one call is signaled by a vibratory signal, and the third and subsequent at least one calls are mute; (j) the first at least one call, in a predetermined period of time, from a given caller or identifier is signaled by a ringtone, with the ringtone volume decreasing with each call, the second and subsequent at least one calls are mute; (k) the first at least one call, in a predetermined period of time, from a given caller or identifier is signaled by a ringtone, with the ringtones differing for each call in the series, the second and subsequent at least one calls are mute; the first at least one call, in a predetermined period of time, from a given caller or identifier is signaled by the same ringtone, second and subsequent at least one calls are mute; and any combination thereof.

4. The system according to claim 1, wherein at least one of the following is being held true: (a) presence of the system in a device is shown by an icon; (b) said system is activated and deactivated via said icon; (c) parameters of the system are set via said icon; (d) said system additionally comprises a private log wherein at least one of callers and call identifiers are stored for a predetermined storage time; wherein said ringtone is determined from the number of calls from said caller or said identifier in said private log; (e) there are at least two screens of alterable parameters, a simple screen and an advanced screen; wherein the parameters alterable via the simple screen are selected from a group consisting of: the predetermined time, the number of calls for each step in the graded series, and any combination thereof; (f) there are at least two screens of alterable parameters, a simple screen and an advanced screen; wherein the parameters alterable via the advanced screen are selected from a group consisting of: progression in the series depends on the maximum time for which a call is counted as part of a series; progression in the series depends on the frequency of the calls; whether calls are checked by caller; whether calls are checked by identifier; whether calls from callers not on any list of callers are always mute (default); whether calls from identifiers not on any list of identifiers are always mute; the number of steps in the graduated series; a time at which the application starts automatically; a time at which the application shuts down automatically; a length of time the application is to run automatically, and any combination thereof; (g) at least one portion of said system is automatically activatable at a predetermined time; (h) at least one portion of said system is automatically activatable automatically after a predetermined time period has passed; (i) at least one portion of said system is automatically activatable at such time as said device is at a predetermined location; (j) at least one portion of said system is automatically activatable at such time as said device has left a predetermined location; (k) at least one portion of said system is automatically activatable at such time as said device is moving at a speed within a predetermined range; (l) at least one portion of said system is automatically activatable at such time as said device is moving at a speed outside said given range; (m) at least one portion of said system is automatically activatable at such time as said device is in a predetermined physical position; (n) at least one portion of said system is automatically activatable at such time as said device is in a physical position different from said predetermined physical position; (o) at least one portion of said system is automatically deactivatable at a predetermined time; (p) at least one portion of said system is automatically deactivatable after a predetermined time period has passed; (q) at least one portion of said system is automatically deactivatable at such time as said device is at a predetermined location; (r) at least one portion of said system is automatically deactivatable at such time as said device has left a predetermined location; (s) at least one portion of said system is automatically deactivatable at such time as said device is moving at a speed within a predetermined range; (t) at least one portion of said system is automatically deactivatable at such time as said device is moving at a speed outside said given range; (u) at least one portion of said system is automatically deactivatable at such time as said device is in a predetermined physical position; (v) at least one portion of said system is automatically deactivatable at such time as said device is in a physical position different from said predetermined physical position; and any combination thereof.

5. A method of enabling a communication device to vary an incoming call notification signal comprising:
   a. storing on said communication device a plurality of ring tone profiles, wherein one ring tone profile is a mute ring tone profile and at least one second ring tone profile is an audible ring tone profile;
   b. recording at least one list of identified callers on said communication device;
   c. acquiring an identifier of at least one member selected from the group consisting of: an identifier of an incoming call and identifier of an incoming message;
   d. detecting whether an acquired identifier exists in said at least one list on said communication device;
   e. determining how many incoming calls have been made within a predetermined period of time having at least one characteristic selected from a group consisting of: (a) being made from the same identifier and (b) being made by the same caller; and
   f. setting the current ringtone profile to said mute ringtone profile, upon determining that said number of incoming calls having said at least one characteristic selected from a group consisting of: (a) being made from the same identifier and (b) being made by the same caller, within said predetermined period of time, is less than a predetermined number;
   g. setting the current ringtone profile to said at least one audible ring tone profile, upon determining that said number of calls having said at least one characteristic selected from a group consisting of: (a) being made from the same identifier and (b) being made by the same caller, within said predetermined period of time, exceeds said predetermined number.

6. The method according to claim 5, additionally comprising at least one member selected from a group consisting of (a) selecting said identifier to be the caller number; said identifier is selected from a group consisting of: a cell phone number, a landline number, an e-mail address, a Skype number, an SMS number, a what's up number, Viber, FaceTime, incoming communication, apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger With You, any communication software that uses internet, and any combination thereof; (b) providing a setting module operable to provide a user interface for the system; (c) selecting said ringtone from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof; and any combination thereof.

7. The method according to claim 5, additionally comprising at least one step selected from a group consisting of (a) basing selection of said ringtone by said switching module on at least one selected from a group consisting of: the frequency of said incoming calls, the number of said incoming calls, the number of said incoming calls within a given time, the time since the last incoming call, and any combination thereof; (b) specifying said first predetermined period of time to be more than about 1 minute and less than about 12 hours; (c) specifying said first predetermined period of time to be about 5 minutes; and any combination thereof.

8. The method according to claim 5, additionally comprising at least one step selected from a group consisting of (a) setting the first at least one call, in a predetermined period of time, from a given caller or identifier to be mute, the second at least one call to be signaled by a vibratory signal, and the third and subsequent at least one calls to be signaled by a ringtone, with the volume of the ringtone increasing with each call; (b) setting the first at least one call, in a predetermined period of time, from a given caller or identifier to be mute, the second at least one call to be signaled by a vibratory signal, and the third and subsequent at least one calls to be signaled by ringtones, with the ringtones differing for each call in the series; (c) setting the first at least one call, in a predetermined period of time, from a given caller or identifier to be mute, the second at least one call to be signaled by a vibratory signal, and the third and subsequent at least one calls to be signaled by the same ringtone; (d) setting the first at least one call, in a predetermined period of time, from a given caller or identifier to be mute, the second and subsequent at least one calls to be signaled by a ringtone, with the volume of the ringtone increasing with each call; (e) setting the first at least one call, in a predetermined period of time, from a given caller or identifier to be mute, the second and subsequent at least one calls to be signaled by ringtones, with the ringtones differing for each call in the series; (f) setting the first at least one call, in a predetermined period of time, from a given caller or identifier to be mute, the second and subsequent at least one calls to be signaled by the same ringtone; (g) setting the first at least one call, in a predetermined period of time, from a given caller or identifier to be signaled by a ringtone, with the ringtone volume decreasing with each call, the second at least one call to be signaled by a vibratory signal, and the third at least one call to be mute; (h) setting the first at least one call, in a predetermined period of time, from a given caller or identifier to be signaled by a ringtone, with the ringtones differing for each call in the series, the second at least one call to be to be signaled by a vibratory signal and subsequent at least one calls being mute; (i) setting the first at least one call, in a predetermined period of time, from a given caller or identifier to be signaled by the same ringtone, second at least one call to be signaled by a vibratory signal, and the third and subsequent at least one calls being mute; (j) setting the first at least one call, in a predetermined period of time, from a given caller or identifier to be signaled by a ringtone, with the ringtone volume decreasing with each call, the second and subsequent at least one calls being mute; (k) setting the first at least one call, in a predetermined period of time, from a given caller or identifier to be signaled by a ringtone, with the ringtones differing for each call in the series, the second and subsequent at least one calls being mute; (l) setting the first at least one call, in a predetermined period of time, from a given caller or identifier to be signaled by the same ringtone, second and subsequent at least one calls being mute; and any combination thereof.

9. The method according to claim 5, additionally comprising steps of: (a) displaying an icon to symbolize presence of the system in a device; (b) at least one step selected from a group consisting of: activating and deactivating the system via the icon; setting parameters of the system via the icon; and any combination thereof.

10. The method according to claim 5, additionally comprising at least one of the following steps: (a) providing at least two screens of alterable parameters, a simple screen and an advanced screen, wherein the parameters alterable via the simple screen are selected from a group consisting of: the predetermined time, the number of calls for each step in the graded series, and any combination thereof (b) providing at least two screens of alterable parameters, a simple screen and an advanced screen, wherein the parameters alterable via the advanced screen are selected from a group consisting of: progression in the series depends on the maximum time for which a call is counted as part of a series; progression in the series depends on the frequency of the calls; whether calls are checked by caller whether calls are checked by identifier; whether calls from callers not on any list of callers are always mute (default); whether calls from identifiers not on any list of identifiers are always mute; the number of steps in the graduated series; a time at which at least a portion of said application starts automatically; a time at which at least a portion of said application shuts down automatically; a length of time the application is to run automatically; whether a graduated series is an increasing or a decreasing series, locations at which said system is activated or deactivated; speeds at which said system is activated or deactivated; types of user for which said system is automatically activated or automatically deactivated and any combination thereof.

11. The method according to claim 5, additionally comprising a step of providing a private log wherein at least one of callers and call identifiers are stored for a predetermined time.

12. The method according to claim 5, additionally comprising a step of providing a private log wherein at least one of callers and call identifiers are stored for a predetermined time and a step of determining said ringtone from a member of a group consisting of: the number of calls from said caller in said private log and the number of calls from said identifier in said private log.

13. The method according to claim 5, additionally comprising at least one of the following steps: (a) automatically activating at least one portion of said system at a predetermined time; (b) automatically activating at least one portion of said system after a predetermined time period has passed; (c) automatically activating at least one portion of said system at such time as said device is at a predetermined location; (d) automatically activating at least one portion of said system at such time as said device has left a predetermined location; (e) automatically activating at least one portion of said system at such time as said device is moving at a speed within a predetermined range; (f) automatically activating at least one portion of said system at such time as said device is moving at a speed outside said given range; (g) automatically activating at least one portion of said system at such time as said device is in a predetermined physical position; (h) automatically activating at least one portion of said system at such time as said device is in a physical position different from said predetermined physical position; (i) automatically deactivating at least one portion of said system at a predetermined time; (j) automatically deactivating at least one portion of said system after a predetermined time period has passed; (k) automatically deactivating at least one portion of said system at such time as said device is at a predetermined location; (l) automatically deactivating at least one portion of said system at such time as said device has left a predetermined location; (m) automatically deactivating at least one portion of said system at such time as said device is moving at a speed within a predetermined range; (n) automatically deactivating at least one portion of said system at such time as said device is moving at a speed outside said given range; (o) automatically deactivating at least one portion of said system at such time as said device is in a predetermined physical position; (p) automatically deactivating at least one portion of said system at such time as said device is in a physical position different from said predetermined physical position; and any combination thereof.

14. A system for enabling a notification signal of a communication device to vary comprising:
   a. a means of storing on said communication device a plurality of ring tone profiles, wherein one ring tone profile is a mute ring tone profile and at least one second ring tone profile is an audible ring tone profile;
   b. a means of recording at least one list of identified callers on said communication device;
   c. a means of acquiring an identifier of at least one member selected from the group consisting of: an identifier of an incoming call, identifier of an incoming communication and identifier of an incoming message;
   d. a means of detecting whether an acquired identifier exists in said at least one list on said communication device;
   e. a means of determining how many incoming communications have been made within a predetermined period of time having at least one characteristic selected from a group consisting of: (a) being made from the same identifier and (b) being made by the same caller; and
   f. a means of setting the current ringtone profile to said mute ringtone profile, upon determining that said number of incoming calls having said at least one characteristic selected from a group consisting of: (a) being made from the same identifier and (b) being made by the same caller, within said predetermined period of time, is less than a predetermined number;
   g. a means of setting the current ringtone profile to said at least one audible ring tone profile, upon determining that said number of calls having said at least one characteristic selected from a group consisting of: (a) being made from the same identifier and (b) being made by the same caller, within said predetermined period of time, exceeds said predetermined number.

15. The system according to claim 14, wherein at least one of the following is being held true (a) said identifier is the caller number; said identifier is selected from a group consisting of: a cell phone number, a landline number, an e-mail address, a Skype number, an SMS number, a what's up number, Viber, FaceTime, incoming communication, Apple video call, google talk, Facebook messenger, msn messenger, yahoo messenger, AOL messenger, icq, WhatsApp, snapchat, MobileVOIP, scydo, VoipBuster, Tango Video Calls, GersenKaKaoTalk, TalkingTomCat, Messenger With You, any communication software that uses internet, and any combination thereof; (b) said system further comprising a means configured to provide a user interface for the system; (c) said ringtone profile is selected from a group consisting of: no signal, a vibration, a fixed pitch audible signal, a varied pitch audible signal, a fixed volume audible signal, a variable volume audible signal, a vocal signal, a fixed color visual signal, a variable color visual signal, a fixed brightness visual signal, a variable brightness visual signal, and any combination thereof; (d) said ringtone is selected based on at least one member selected from a group consisting of: the frequency of said incoming communications, the number of said incoming communications, the number of said incoming communications within a given time, the time since the last incoming communication, any combination thereof; and (e) any combination thereof.

16. The mobile telecommunication device according to claim 14 wherein at least one of the following is being held true: (a) the first at least one call, in a predetermined period of time, from a given caller or identifier is mute, the second at least one call is signaled by a vibratory signal, and the third and subsequent at least one calls are signaled by a ringtone, with the volume of the ringtone increasing with each call; (b) the first at least one call, in a predetermined period of time, from a given caller or identifier is mute, the second at least one call is signaled by a vibratory signal, and the third and subsequent at least one calls are signaled by ringtones, with the ringtones differing for each call in the series; (c) the first at least one call, in a predetermined period of time, from a given caller or identifier is mute, the second at least one call is signaled by a vibratory signal, and the third and subsequent at least one calls are signaled by the same ringtone; (d) the first at least one call, in a predetermined period of time, from a given caller or identifier is mute, the second and subsequent at least one calls are signaled by a ringtone, with the volume of the ringtone increasing with each call; (e) the first at least one call, in a predetermined period of time, from a given caller or identifier is mute, the second and subsequent at least one calls are signaled by ringtones, with the ringtones differing for each call in the series; (f) the first at least one call, in a predetermined period of time, from a given caller or identifier is mute, the second and subsequent at least one calls are signaled by the same ringtone; (g) the first at least one call, in a predetermined period of time, from a given caller or identifier is signaled by a ringtone, with the ringtone volume decreasing with each call, the second at least one call is signaled by a vibratory signal, and the third at least one call is mute; (h) the first at least one call, in a predetermined period of time, from a given caller or identifier is signaled by a ringtone, with the ringtones differing for each call in the series, the second at least one call is signaled by a vibratory signal and subsequent at least one calls are mute; (i) the first at least one call, in a predetermined period of time, from a given caller or identifier is signaled by the same ringtone, second at least one call is signaled by a vibratory signal, and the third and subsequent at least one calls are mute; (j) the first at least one call, in a predetermined period of time, from a given caller or identifier is signaled by a ringtone, with the ringtone volume decreasing with each call, the second and subsequent at least one calls are mute; (k) the first at least one call, in a predetermined period of time, from a given caller or identifier is signaled by a ringtone, with the ringtones differing for each call in the series, the second and subsequent at least one calls are mute; the first at least one call, in a predetermined period of time, from a given caller or identifier is signaled by the same ringtone, second and subsequent at least one calls are mute; and any combination thereof.

17. The system according to claim 14, wherein at least one of the following is being held true: (a) presence of the system in a device is shown by an icon; (b) said system is activated and deactivated via said icon; (c) parameters of the system are set via said icon; (d) said system additionally comprises a private log wherein at least one of callers and call identifiers are stored for a predetermined storage time; wherein said ringtone is determined from the number of calls from said caller or said identifier in said private log; (e) there are at least two screens of alterable parameters, a simple screen and an advanced screen; wherein the parameters alterable via the simple screen are selected from a group consisting of: the predetermined time, the number of calls for each step in the graded series, and any combination thereof; (f) there are at least two screens of alterable parameters, a simple screen and an advanced screen; wherein the parameters alterable via the advanced screen are selected from a group consisting of: progression in the series depends on the maximum time for which a call is counted as part of a series; progression in the series depends on the frequency of the calls; whether calls are checked by caller; whether calls are checked by identifier; whether calls from callers not on any list of callers are always mute (default); whether calls from identifiers not on any list of identifiers are always mute; the number of steps in the graduated series; a time at which the application starts automatically; a time at which the application shuts down automatically; a length of time the application is to run automatically, and any combination thereof; (g) at least one portion of said system is automatically activatable at a predetermined time; (h) at least one portion of said system is automatically activatable automatically after a predetermined time period has passed; (i) at least one portion of said system is automatically activatable at such time as said device is at a predetermined location; (j) at least one portion of said system is automatically activatable at such time as said device has left a predetermined location; (k) at least one portion of said system is automatically activatable at such time as said device is moving at a speed within a predetermined range; (l) at least one portion of said system is automatically activatable at such time as said device is moving at a speed outside said given range; (m) at least one portion of said system is automatically activatable at such time as said device is in a predetermined physical position; (n) at least one portion of said system is automatically activatable at such time as said device is in a physical position different from said predetermined physical position; (o) at least one portion of said system is automatically deactivatable at a predetermined time; (p) at least one portion of said system is automatically deactivatable after a predetermined time period has passed; (q) at least one portion of said system is automatically deactivatable at such time as said device is at a predetermined location; (r) at least one portion of said system is automatically deactivatable at such time as said device has left a predetermined location; (s) at least one portion of said system is automatically deactivatable at such time as said device is moving at a speed within a predetermined range; (t) at least one portion of said system is automatically deactivatable at such time as said device is moving at a speed outside said given range; (u) at least one portion of said system is automatically deactivatable at such time as said device is in a predetermined physical position; (v) at least one portion of said system is automatically deactivatable at such time as said device is in a physical position different from said predetermined physical position; and any combination thereof.

\* \* \* \* \*